US010546298B2

(12) United States Patent
Quiroga et al.

(10) Patent No.: US 10,546,298 B2
(45) Date of Patent: Jan. 28, 2020

(54) ISSUANCE OF VIRTUAL ELECTRONIC CARDS USING DEVICE AND USER-SPECIFIC AUTHENTICATION INFORMATION

(71) Applicant: Ciphertext Solutions, Inc., Carlstadt, NJ (US)

(72) Inventors: Walter E. Quiroga, Hoboken, NJ (US); Philip G. Schmidt, Lawrenceville, NJ (US); William Friedewald, New York, NY (US)

(73) Assignee: Ciphertext Solutions, Inc., Hoboken, NJ (US)

( * ) Notice: Subject to any disclaimer, the term of this patent is extended or adjusted under 35 U.S.C. 154(b) by 66 days.

(21) Appl. No.: 15/497,177

(22) Filed: Apr. 25, 2017

(65) Prior Publication Data

US 2017/0308902 A1    Oct. 26, 2017

Related U.S. Application Data

(60) Provisional application No. 62/327,853, filed on Apr. 26, 2016.

(51) Int. Cl.
*G06F 9/44* (2018.01)
*G06Q 20/40* (2012.01)
(Continued)

(52) U.S. Cl.
CPC ....... *G06Q 20/40145* (2013.01); *G06Q 20/22* (2013.01); *G06Q 20/322* (2013.01);
(Continued)

(58) Field of Classification Search
CPC .................. G06F 9/44589; G06F 11/3688
(Continued)

(56) References Cited

U.S. PATENT DOCUMENTS 7,603,548 B2 * 10/2009 Patrick ............... G06F 21/6218
713/150
2015/0046339 A1    2/2015 Wong et al.
(Continued)

FOREIGN PATENT DOCUMENTS

WO    WO-2009/080854    7/2009

OTHER PUBLICATIONS

"iOS Security Contents", http://images.apple.com/privacy/docs/iOS_Security_Guide_Oct_2014.pdf, Oct. 1, 2014, 50 pages.
(Continued)

*Primary Examiner* — Chuck O Kendall
(74) *Attorney, Agent, or Firm* — Foley & Lardner LLP; Christopher J. McKenna

(57) ABSTRACT

An authentication application may securely communicate with a secure gateway using encryption based on an identifier of the plugin. The authentication application may authorize the plugin based on the identifier. The plug-in may receive biometric information and a unique device identifier. The authentication application may authenticate the user for use of the authorized plugin based the biometric information and the unique device identifier. The plug-in may receive a request to issue a new electronic card via the secure gateway. The plug-in may receive, responsive to sending the request via a secure communication channel with the secure gateway, the electronic card information issued to the device via the secure gateway. The plug-in may automatically add, responsive to receiving the electronic card information, the electronic card information into a mobile payment application of the device using the electronic card information.

26 Claims, 19 Drawing Sheets

(51) Int. Cl.
  *G06Q 20/22* (2012.01)
  *G06Q 20/32* (2012.01)
  *G06Q 20/34* (2012.01)
  *G06Q 30/06* (2012.01)
  *G06F 21/31* (2013.01)
  *G06F 21/32* (2013.01)
  *G06Q 20/36* (2012.01)
  *H04W 12/06* (2009.01)

(52) U.S. Cl.
  CPC ........... *G06Q 20/351* (2013.01); *G06Q 30/06* (2013.01); *G06F 21/31* (2013.01); *G06F 21/32* (2013.01); *G06Q 20/3674* (2013.01); *H04W 12/06* (2013.01)

(58) Field of Classification Search
  USPC .................................................. 717/121, 126
  See application file for complete search history.

(56) References Cited

U.S. PATENT DOCUMENTS

| | | | |
|---|---|---|---|
| 2015/0140960 A1 | 5/2015 | Powell et al. | |
| 2016/0104154 A1 | 4/2016 | Milov et al. | |
| 2016/0373458 A1* | 12/2016 | Moreton | H04L 63/102 |
| 2017/0308902 A1* | 10/2017 | Quiroga | G06Q 30/06 |

OTHER PUBLICATIONS

"The New Mobile Payment Landscape", GSM Association, GSM Floor2 the Walbrook Building 25 Wallbrook London, UK, Jul. 23, 2015, p. 13-22.

International Search Report and Written Opinion on PCT/US2017/029489 dated Jun. 27, 2017, 16 pages.

* cited by examiner

ISSUANCE OF VIRTUAL ELECTRONIC CARDS USING DEVICE AND USER-SPECIFIC AUTHENTICATION INFORMATION

CROSS-REFERENCES TO RELATED APPLICATIONS

This application claims priority to U.S. Patent Application No. 62/327,853, filed Apr. 26, 2016, titled "Electronic Credit, Gift, and Bank Card Issuing System Software," which is incorporated herein by reference in its entirety.

TECHNICAL FIELD

The present application relates generally to systems and methods for authentication of user credentials via application extensions.

BACKGROUND

End users may make financial transactions by electronic funds transfer using physical payment cards. Such transactions may be vulnerable to identity theft and other forms of fraud. Current forms of protection may be slow-reacting to detect and address such security vulnerabilities. Under such systems, upon detecting the fraud, card-issuing entities may take days or event weeks to issue new physical payment cards.

SUMMARY

At least one aspect is directed to a method of authenticating and issuing electronic cards using encryption information passed via plug-ins. An authentication application on a device of a user may receive a unique identifier of a plugin to be installed for use within the authentication application. The authentication application may securely communicate with a secure gateway using encryption based on at least the unique identifier of the plugin. The authentication application may authorize the plugin based on at least the unique identifier. The authentication application may receive, for the authorized plugin installed in the authentication application, biometric information of the user and a unique device identifier. The authentication application may authenticate the user for use of the authorized plugin based on at least the biometric information of the user and the unique device identifier. The authorized plugin may receive a request from the user to issue an electronic card via the secure gateway. The plugin may receive, responsive to sending the request via a secure communication channel with the security gateway, the electronic card information for the electronic card issued to the user of the device via a receiver of the request via the secure gateway. The plugin may add, responsive to receiving the electronic card information, the electronic card into a mobile payment application of the device using the electronic card information.

In some embodiments, the plugin may remove the electronic card information from memory of the device upon adding the electronic card into the mobile payment application. In some embodiments, the unique identifier of the plugin may be issued to the receiver by a party controlling use of plugins with the authentication application. In some embodiments, the authentication application may validate that the unique identifier of the plugin was issued to the plugin.

In some embodiments, the plugin may receive biometric information of the user comprising one of fingerprint, a voice input, one or more facial characteristics, one or more iris characteristics or biometric input supported by the device. In some embodiments, the plugin may obtain, from memory or storage of the device the unique device identifier comprising one of a universal unique device identifier, an advertising identifier, a telephone number or media access control identifier. In some embodiments, the plugin may authenticate the user for one of a one time use or a limited duration use, for a transaction via the secure gateway. In some embodiments, the plugin may receive a personal identification identifier entered by the user via the device.

In some embodiments, the authentication application may authenticate the user for use of the authorized plugin based on at least the biometric information of the user, the unique device identifier and the personal identification identifier. In some embodiments, the plugin may establish between the authorized plugin and the secure gateway the secure communication channel using at least the unique identifier of the plugin. In some embodiments, the plugin may transmit, via the secure gateway to the receiver, identification of the user and the unique device identifier. In some embodiments, the plugin may add the electronic card to a mobile electronic wallet provided by the mobile payment application using an application programming interface of the mobile payment application. In some embodiments, the electronic card information may include an encrypted electronic card token.

At least one aspect is directed to a system for authenticating and issuing electronic cards using encryption information passed via plug-ins. The system may include an authentication application on a device of a user. The authentication application may receive a unique identifier of a plugin to be installed for use within the authentication application. The authentication application may secure communicate with a secure gateway using encryption based on at least the unique identifier of the plugin. The authentication application may have authorized the plugin based on at least the unique identifier. The authorized plugin may be installed in the authentication application. The authorized plug-in may receive biometric information of the user and a unique device identifier. The authorized plug-in may authenticate the user for use of the authorized plugin based on at least the biometric information of the user and the unique device identifier. The authorized plug-in may receive a request from the user to issue an electronic card via the secure gateway. The authorized plug-in may receive, responsive to sending the request via a secure communication channel with the security gateway, electronic card information of the electronic card issued to the user of the device via a receiver of the request via the secure gateway. The authorized plug-in may automatically add, responsive to receiving the electronic card information, the electronic card into a mobile payment application on the device using the electronic card information decrypted in memory.

In some embodiments, the plugin may remove the electronic card information from memory of the device upon adding the electronic card into the mobile payment application. In some embodiments, the unique identifier of the plugin may be issued to the receiver by a party controlling use of plugins with the authentication application. In some embodiments, the authentication application may validate that the unique identifier of the plugin was issued to the plugin. In some embodiments, the biometric information of the user may include one of fingerprint, a voice input, one or more facial characteristics or one or more iris characteristics or biometric input supported by the device.

In some embodiments, the plugin may obtain from memory or storage of the device the unique device identifier comprising one of a universal unique device identifier, an advertising identifier, a telephone number or media access control identifier. In some embodiments, the plugin may authenticate the user for one of a one time use or a use for a limited duration, for a transaction via the secure gateway. In some embodiments, the plugin may receive a personal identification identifier entered by the user via the device. In some embodiments, the plugin may authenticate the user for use of the authorized plugin based on at least the biometric information of the user, the unique device identifier and the personal identification identifier In some embodiments, the authentication application and the secure gateway may establish the secure communication channel using at least the unique identifier of the plugin. In some embodiments, the plugin may transmit via the secure gateway to the receiver, identification of the user and unique device identifier. In some embodiments, the plugin may add the electronic card to a mobile electronic wallet provided by the mobile payment application using an application programming interface of the mobile payment application. In some embodiments, the electronic card information may include an encrypted electronic card token.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

It should be understood that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

Figure 1:
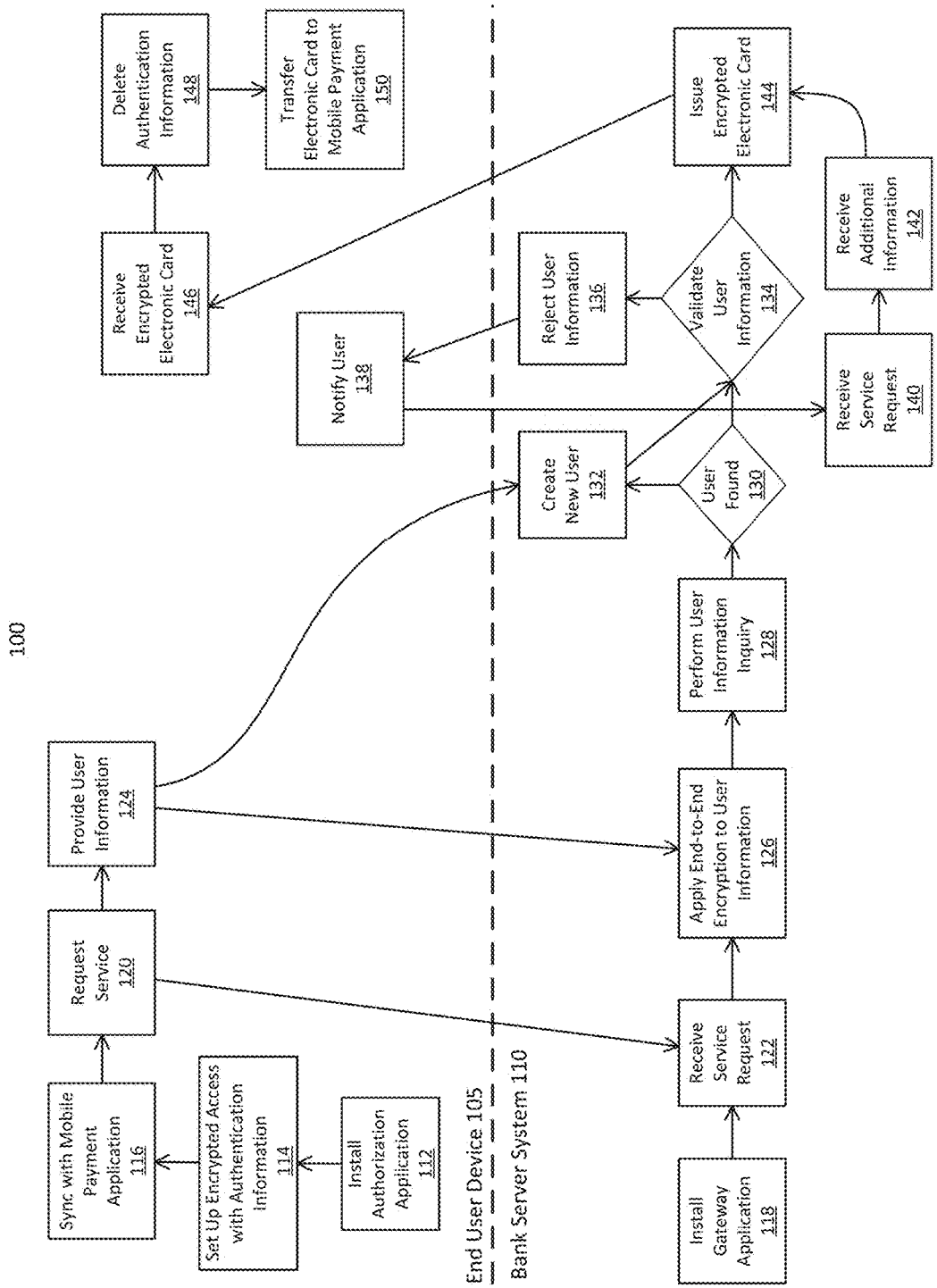
FIG. 1 is a flow diagram depicting a method of authenticating and issuing electronic cards using encryption information passed via plug-ins, according to an illustrative embodiment.

The features and advantages of the concepts disclosed herein will become more apparent from the detailed description set forth below when taken in conjunction with the drawings.

DETAILED DESCRIPTION

Following below are more detailed descriptions of various concepts related to, and embodiments of authenticating and issuing electronic cards using encryption information passed via plug-ins. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes embodiments of authenticating and issuing electronic cards using encryption information passed via plug-ins.

Section B describes a network environment and computing environment which may be useful for practicing various computing related embodiments described herein.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

A. Systems and Methods of Authenticating and Issuing Electronic Cards Using Encryption Information Passed Via Plug-Ins To address the limitations presented in current identity theft detection and countermeasure systems, disclosed herein are systems and methods of authenticating and issuing electronic cards using encryption information passed via plug-ins. An authentication application on an end user device may establish a secure session with a secure gateway of a bank server. The authentication application may receive an identifier for a plug-in via the secure session from the secure gateway of the bank server. Using the identifier, the authentication application may authenticate and may install the plug-in for use. Once installed, the plug-in may be used to receive authentication information, such as biometric information, personal identification number, and device identifier, among others. The authentication application in turn may verify whether the authentication information matches previously stored authentication information. If the two match, the application may authenticate the user for issuance of new electronic card. Upon indication by the user, the plug-in may transmit a request to the secure gateway of the bank server to issue a new electronic card. The plug-in may in turn receive encrypted information for the electronic card from the secure gateway of the bank server. The plug-in may then add and transfer the encrypted information for the electronic card to a mobile payment application, thereby permitting the mobile payment application to use the electronic card to make financial transactions with the information. As an added security measure, the authentication application may then erase the encrypted card information from memory. Instead of issuing a physical electronic card, issuance of an electronic card in this manner may reduce an amount of time between detection of fraud and restart of transaction and may also improve security.

Referring now to FIG. 1, depicted is a flow diagram of a process 100 for authenticating and issuing electronic cards using encryption information passed via plug-ins. The functionalities of the process 100 may be performed on an end user device 105 and a bank server system 110 across a network. The end user device 105 and the bank server system 110 each may include the components and functionalities of the computing system 700 detailed herein in conjunction with FIGS. 7A-7D. The network may include the functionalities of the network 704 and the cloud 708 detailed herein in conjunction with FIGS. 7A-7D.

In further detail, at step 112, an end user device 105 may download and install an authorization application. At step 114, the end user device 105 may set up an encrypted access for the authorization application with authentication information, such as biometric information (e.g., fingerprint) and a personal identification number (PIN). At step 116, the end user device 105 may configure the authorization application to sync with a mobile payment application. At step 118, the bank server system 110 may install a gateway application to interface with the authorization application executing on the end user device 105.

To initiate the authentication process, at step 120, the end user device 105 may send a request for service to the bank server system 110. At step 122, the bank server system 110 may receive the service request from the end user device 105. At step 124, the end user device 105 may provide user information to the bank server system 110. At step 126, the bank server system 110 may apply end-to-end encryption to user information received from the end user device 105, thereby preventing other devices connected to the network from accessing user information.

At step 128, the bank server system 110 may perform a user information query on a database. At step 130, the bank server system 110 may determine whether the user information is found on the database. If the user information is not found, at step 132, the secure gateway 110 may create a new user profile using the user information and may continue to step 134. If the user information is found, at step 134, the bank server system 110 may determine whether the user information is valid. If the user information is not valid, at step 136, the bank server system 110 may reject the user information. In addition, at step 138, the bank server system 110 may notify the user of the end user device 105. In turn, at step 140, the bank server system 110 may receive another service request from the end user device 105. At step 142, the bank server system 110 may receive additional information from the service request.

Upon validation of the user information, at step 144, the bank server system 110 may issue an encrypted electronic card based on the user information. At step 146, the end user device 105 may receive the encrypted electronic card. At step 148, the end user device 105 may delete authentication information from memory. At step 150, the end user device 105 may transfer the encrypted electronic card to the mobile payment application. The process 100 from start to finish may take anywhere from minutes to seconds, much shorter than current techniques at addressing identify theft and fraud. In this manner, the end user may make additional financial transactions shortly after detection of suspicious activity.

Figure 2:
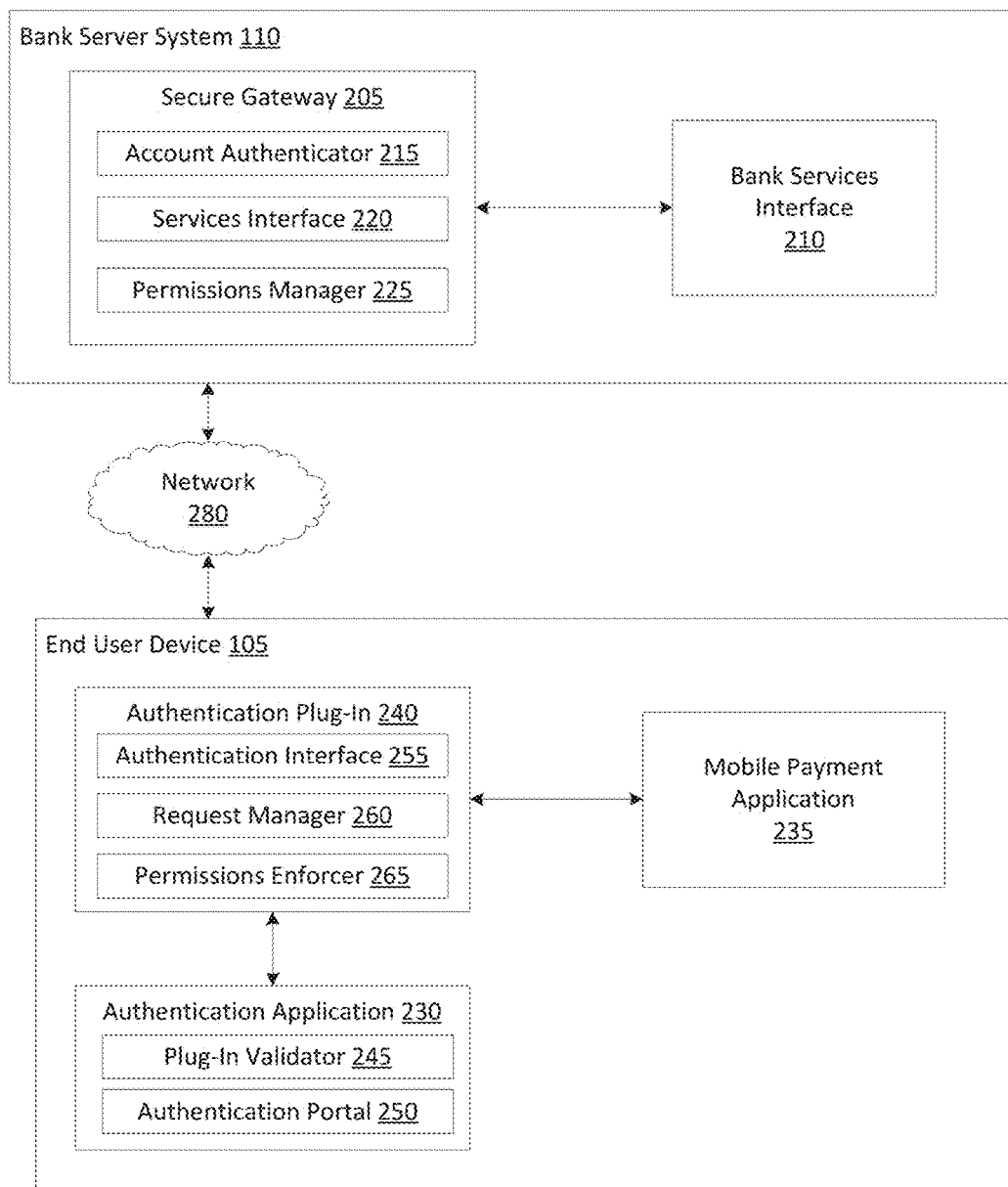
FIG. 2 is a block diagram depicting a system for authenticating and issuing electronic cards using encryption information passed via plug-ins, according to an illustrative embodiment.

Referring now to FIG. 2, illustrated is a block diagram of a system 200 for authenticating and issuing electronic cards using encryption information passed via plug-ins. The system 200 may include the end user device 105 and the bank server system 110 described previously in conjunction with FIG. 1, and a network 280. In overview, the bank server system 110 may include a secure gateway 205 and a bank services interface 210. The secure gateway 205 may include an account authenticator 215, a services interface 220, and a permissions manager 225. The end user device 105 may include an authorization application 230, a mobile payment application 235, and an authentication plug-in 240. The authentication application 230 may include a plug-in validator 245 and an authentication portal 250. The authentication plug-in 240 may include an authentication interface 255, a request manager 260, and a permissions enforcer 265. Each of the secure gateway 205, the bank services interface 210, the authorization application 230, the mobile payment application 235, and the authentication plug-in 240 and the components or modules therein may each include hardware or a combination of software and hardware, such as those described herein conjunction with FIG. 7A-7D. The network 280 may include the functionalities of the network 704 and the cloud 708 detailed herein in conjunction with FIGS. 7A-7D.

To initiate and manage installation of the authentication plug-in 240, the plug-in validator 245 of the authentication application 230 may securely communicate with the bank server system 110 via the network 280. In some embodiments, the plug-in validator 245 may establish a secure communications session between the end user device 105 and the bank server system 110 via the network 280. In some embodiments, the plug-in validator 245 may establish the secure communications session between the authentication application 230 and the secure gateway 205 of the bank server system 110. The secure communications session may be in accordance to any communication protocol, such as a Transport Layer Security (TLS) session, a Secure Sockets Layer (SSL) session, a Virtual Private Network (VPL) session, Secure Socket Tunneling Protocol (SSTP) session, an Internet Protocol Security (IPsec) session, and a Point-to-Point Tunneling Protocol (PPTP), among others. In some embodiments, the secure communications session may be encrypted using any cryptographic techniques, such as public key cryptography (e.g., Diffie-Hellman key exchange, digital signature algorithm, RSA, etc.) and symmetric key algorithms (e.g., block ciphers, stream ciphers, etc.), among others. The secure communications session may be via a network interface (e.g., receiver) at the end user device 105.

Through the secure communications established between the end user device 105 and secure gateway 205 of the bank server system 110, the plug-in validator 245 may receive a unique identifier for the to-be-installed authentication plug-in 240 via a communication interface (e.g., a receiver). The unique identifier for the authentication plug-in 240 may be used to encrypt the secure communications session established between the authentication application 230 of the end user device 105 and the secure gateway 205 of the bank server system 110. The unique identifier for the authentication plug-in 240 may include any alphanumeric value (e.g., serial number, hash value, etc.) corresponding to the authentication plug-in 240. The unique identifier may be generated by a party (e.g., a card issuing entity) controlling the use of the authentication plug-in 240 with the authentication application 230. In some embodiments, the unique identifier may be generated by the bank server system 110 for use on the end user device 105.

Using the unique identifier received from the secure gateway 205 of the bank server system 110, the plug-in validator 245 may authorize the to-be-installed authentication plug-in 240. The plug-in validator 245 may validate the unique identifier for the to-be-installed authentication plug-in 240. In some embodiments, the plug-in validator 245 may determine whether the unique identifier for the to-be-installed authentication plug-in 240 matches a valid identifier. The valid identifier may include a template used by the plug-in validator 245 to determine whether the unique identifier is of a proper form. If there is a match, the plug-in validator 245 may validate the unique identifier for the authentication plug-in 240 and may initiate installation of the authentication plug-in 240. If there is no match, the plug-in validator 245 may restrict the installation of the authentication plug-in 240.

Upon authorization of the unique identifier, the plug-in validator 245 may initiate installation of the authentication plug-in 240. The plug-in validator 245 or otherwise the memory of the end user device 105 may include package instructions for installing or unpacking the authentication plug-in 240. The plug-in validator 245 may execute the package instruction to install and unpack the authentication plug-in 240, responsive to authorization of the unique identifier. In some embodiments, the plug-in validator 245 may send a request to download the package instructions from the bank server system 110 or an application server. The plug-in validator 245 may in turn receive the package instructions from the bank server 110 or the application server. Upon receipt of the package instructions, the plug-in validator 245 may run or execute the package instructions to install the authentication plug-in 240.

Subsequent to installation of the authentication plug-in 240, the authentication portal 250 of the authentication application 230 may receive authentication information via input/output (I/O) interface devices of the end user device 105 for the authentication plug-in 240. The I/O interface may include a keyboard, a microphone, a camera, a fingerprint sensor, a tactile sensor, and a mouse, among others. In some embodiments, the authentication portal 250 may receive biometric information of the user via the I/O interface. The biometric information may include fingerprint, a voice input, facial image, and iris image, among others. In some embodiments, the authentication portal 250 may receive a personal identification number (PIN) via the I/O interface. The personal identification number may include an alphanumeric or numeric string of any length. In some embodiments, the authentication portal 250 may identify, receive, or otherwise obtain a unique device identifier from memory or storage of the end user device 105. The unique device identifier may include an alphanumeric or numeric string of any length. In some embodiments, the unique device identifier may include a universal unique device identifier (e.g., device serial number), an advertising identifier, a telephone number, media access control identifier (e.g., MAC address), and Internet Protocol address (e.g., IP address), a GPS location (e.g., coordinate location) among others. In this manner, the authentication portal 250 may retrieve or identify authentication information unique to the end user device 105 and to the user operating the end user device 105. As will be explicated below, this schema may allow for improved security.

With the obtaining of the authentication information, the authentication portal 250 of the authentication application 230 may authenticate the use of the authentication plug-in 240. In some embodiments, the authentication portal 250 may determine whether the authentication portal 250 has obtained the authentication information from the user for the first time. In some embodiments, the authentication portal 250 may identify whether other authentication information is stored at the end user device 105 or at the bank server system 110. If the authentication portal 250 has obtained the authentication information for the first time, the authentication portal 250 may store the authentication information on memory of the end user device 105 or send to the bank server 105 for storage for future comparisons. The authentication portal 250 may then permit the use of the authentication plug-in 240. The authentication portal 250 may permit the authentication plug-in 240 to communicate with the secure gateway 205.

On the other hand, if the authentication portal 250 has obtained the authentication information subsequent to the first time, the authentication portal 250 may determine whether the authentication information received from the authentication plug-in 240 matches authentication information previously stored for the user. In some embodiments, the authentication portal 250 may access the memory local to the end user device 105 to retrieve the previously stored authentication information. In some embodiments, the authentication portal 250 may send a request to the secure gateway 205 of the bank server 110 to retrieve the previously stored authentication information. Upon access of the previously stored authentication information, the authentication portal 250 may determine whether the current authentication information matches the previously stored authentication information. If there is a match, the authentication portal 250 may permit use of the authentication plug-in 240 and may permit the authentication plug-in 240 to communicate with the secure gateway 205. In some embodiments, the authentication portal 250 may permit use of the authentication plug-in 240 for one use time or of a limited duration for transaction(s) with the secure gateway 205 of the bank server system 110. If there is no match, the authentication portal 250 may display a prompt for re-entering of the authentication information via the I/O interface of the end user device 105.

Once authenticated, the authentication interface 255 of the authentication plug-in 240 may interface with the plug-in validator 250. In some embodiments, the authentication interface 255 may receive an indication of authentication from the authentication portal 250. The authentication interface 255 may certify the user of the end user device 105 for continual use of the authentication plug-in 240. Upon installation and/or certification, the authentication interface 255 may establish the secure communications session between the authentication plug-in 240 and the secure gateway 205. In some embodiments, the authentication interface 255 may use the secure communications session established between the authentication application 230 and the secure gateway 205 for subsequent communications. In some embodiments, the authentication interface 255 may encrypt the secure communications session between the authentication plug-in 240 and the secure gateway 205 using the unique identifier for the authentication plug-in 240.

With the communication session established, the authentication interface 255 may transmit the indication of authentication to the secure gateway 205. The indication of authentication may also include the unique identifier corresponding to the authentication plug-in 240 installed at the end user device 105. Upon receipt, the account authenticator 215 may identify the end user device 105 as permitted to use the authentication plug-in 240. The account authenticator 215 may also associate the unique identifier with the end user device 105. The account authenticator 215 may permit additional communications between the authentication plug-in 240 and the secure gateway 205. In some embodiments, the indication of authentication may include whether the communication is to be one-time use or of a limited duration for a transaction. In some embodiments, the account authenticator 215 may permit the use of the authentication plug-in 240 for the secure communication for one-time use or of the limited duration as indicated in the indication of authentication. The account authenticator 215 may also generate another device identifier and another user identifier for the secure communications session. The account authenticator 215 may transmit the other device identifier and user identifier for the secure communication session to the authentication interface 255.

As the authentication plug-in 240 is running, the request manager 260 may receive a request to issue a new electronic card from the user. The request may be received via the I/O interface when the user is prompted to enter information. The request to issue the new electronic card may include an entity identifier (e.g., bank name), an account identifier (e.g., bank account number), an account type (e.g., checking, savings, credit, or debit, etc.), and an access code (e.g., password) among other information. The request manager 250 in turn may transmit the request to issue the new electronic card to the secure gateway 205 via the secure communications session established between the authentication plug-in 240 and the authentication application 230.

At the bank server system 110, the secure gateway 205 may in turn receive the request to issue the new electronic card from the authentication plug-in 240 running on the end user device 105. The services interface 220 may compare the information included in the request to issue the interface to previously stored account data. In some embodiments, the services interface 220 may identify the entity identifier from the request. The services interface 220 may identify the bank services interface 210 corresponding to the entity identifier. The bank services interface 210 may be another server or computing device used to interface and relay information with other devices connected to the network 280. The services interface 220 may forward the request to issue the electronic card to the bank services interface 210 identified as corresponding with the entity identifier.

Upon receipt of the request, the bank services interface 210 of the bank server system 110 in turn may identify the account identifier from the request. The bank services interface 210 may determine whether the account identifier exists. If the account identifier does not exist, the bank services interface 210 may transmit a denial of issuance message to the account authenticator 215. The services interface 220 may in turn forward the denial message to the request manager 250. The request manager 250 may in turn display a prompt on the display of the end user device 105 to re-enter account information for the request.

On the other hand, if the account identifier exists, the bank services interface 210 may proceed to validate the information included in the request. The bank services interface 210 may compare the access code for the identified account identifier with the previously stored access code for the identifier account identifier. If the access codes do not match, the bank services interface 210 may transmit a denial of issuance message to the services interface 220. The services interface 220 may in turn forward the denial message to the request manager 250. The request manager 250 may in turn display a prompt on the display of the end user device 105 to re-enter account information for the request. In contrast, if the access codes match, the bank services interface 210 may transmit an issuance message. In some embodiments, the bank services interface 210 may further identify the account type specified by the request. In some embodiments, the issuance message may include electronic card information. The electronic card information may include a bank card number and a card security code, among others. Both the bank card number and the card security code may be in compliance with the ISO/IEC 7812 and ISO/IEC JTC 1/SC 17/WG 1 standards. In some embodiments, the electronic card information may include an encrypted electronic card token. The encrypted electronic card token may include an cryptographic key or value generated using other electronic card information (e.g., using a cryptographic hash function of the bank card number, the card security code, etc.). The services interface 220 may in turn receive the issuance message and may forward the issuance message to the request manager 260 at the end user device 105.

In addition, upon receipt of the issuance message, the permissions manager 225 may also generate transaction permissions for transmission to the end user device 105. The transactions permissions may indicate permission to the authentication plug-in 240 to interface with the mobile payment application 235. The transactions permissions may also include a specification as to which transactions made are permitted. The specification may include a spend limit and a time limit, among others. Responsive to receipt of the transaction permissions, the permissions enforcer 265 may store the transactions permissions on memory and may apply the transaction permissions to the transactions made using the mobile payment application 235.

Responsive to receipt of the issuance message from the services interface 220, the request manager 260 may add or transfer the issuance message to the mobile payment application 235. The addition or transferal of the issuance message may be via an application programming interface (API) of the mobile payment application 235. In some embodiments, the request manager 260 may add or transfer the electronic card information of the issuance message to the mobile payment application 235. In some embodiments, the request manager 260 may add or transfer the encrypted electronic card token of the electronic card information to the mobile payment application 235. In some embodiments, the request manager 260 may add or transfer the issuance message to a mobile electronic wallet provided by or associated with the mobile payment application 235 using an application program interface of the mobile payment application 235.

Addition or transferal of the issuance message to the mobile payment application 235 may allow the mobile payment application 235 to conduct or make financial transactions using the information in the issuance message. The mobile payment application 235 may store the issuance message on a portion of the memory of the end user device 105 dedicated or assigned to the mobile payment application 235. In some embodiments, the mobile payment application 235 may store the issuance message on a payment card server connected via the network 280. Once added or stored, the mobile payment application 235 may indicate to the request manager 260 completion of addition or transferal.

The mobile payment application 235 may receive a transaction request via an I/O interface of the end user device 105. In some embodiments, the transaction request may be received via a near-field communication (NFC) detector from a point-of-sale (POS) device (e.g., barcode scanner, cash register, payment terminal, etc.). The transaction request may include a numeric value corresponding to an amount of currency to be transferred from one bank account to another. Upon the transaction request, the mobile payment application 235 may use the electronic card information to make the transaction.

The mobile payment application 235 may transmit the electronic card information of the issuance message to the bank server system 110 to complete the transaction. In some embodiments, the mobile payment application 235 may transmit the encrypted electronic card token of the issuance message to the bank server system 110 to complete the transaction. In some embodiments, the mobile payment application 235 may forward the transaction request to the payment card server via the network 280. The payment card server in turn may complete the transaction with the bank server system 110. In some embodiments, the mobile payment application 235 may transmit the electronic card information or the encrypted electronic card to the POS device to complete the transaction.

Subsequent to the addition or transferal of the issuance message, the authentication portal 250 or the request manager 260 may delete the issuance message from the memory of the end user device 105. In some embodiments, the authentication portal 250 or the request manager 260 may delete the electronic card information from the memory of the end user device 105. In some embodiments, the authentication portal 250 or the request manager 260 may delete the encrypted electronic card token from the memory of the end user device 105. In some embodiments, the authentication portal 250 or the request manager 260 may delete the issuance message from the portion of memory assigned to the authentication application 230 or the authentication plug-in 240. In some embodiments, the authentication portal 250 or the request manager 260 may delete the electronic card information and/or the encrypted electronic card token of the electronic card information from the portion of memory assigned to the authentication application 230 or the authentication plug-in 240. In some embodiments, the authentication portal 250 or the request manager 260 may delete the issuance message, responsive to the mobile payment application 235 indicating completion of addition or transferal. In this manner, the authentication application 230 and the authentication plug-in 240 may allow for quick recovery of the ability to make secure, encrypted financial transaction, shortly after detection of identity theft or other types of fraud.

It should be appreciated that this process may be repeated several times. The authentication application 230 and the authentication plug-in 240 may also allow for reissuance of electronic cards and cancelation of electronic cards. In some embodiments, responsive to a request to reissue, the authentication application 230 and the authentication plug-in 240 may cause the mobile payment application 235 to delete the old electronic card information, and may repeat the functionalities above to receive another issuance message from the bank server system 110. In some embodiments, responsive to a cancelation of the electronic card, the authentication application 230 and the authentication plug-in 240 may indicate or command the mobile payment application 235 to erase or delete the old electronic card information.

Figure 3A:
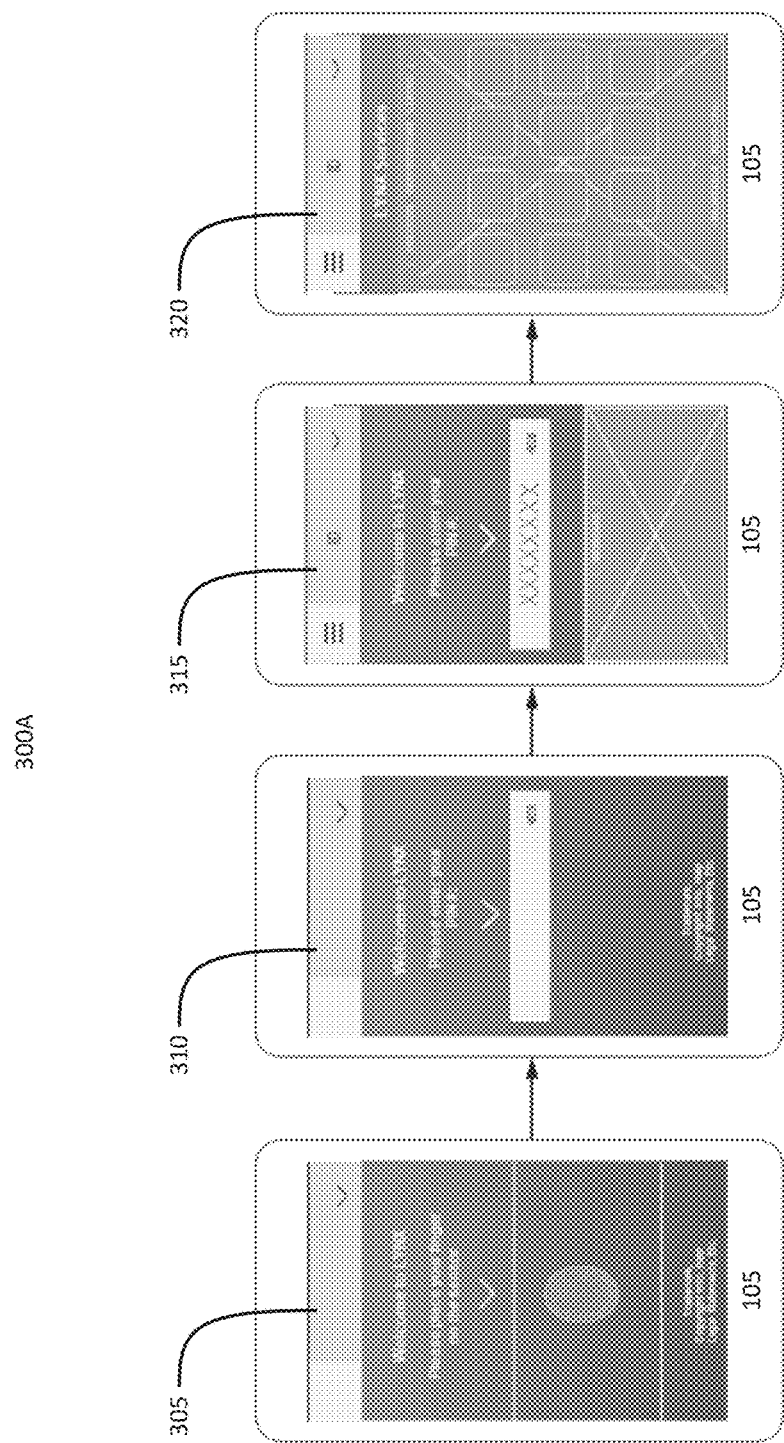
FIGS. 3A-3C are block diagrams depicting graphical user interfaces on a display element of an end user computing device for authenticating and issuing electronic cards using encryption information passed via plug-ins, according to an illustrative embodiment.
Figure 3B:
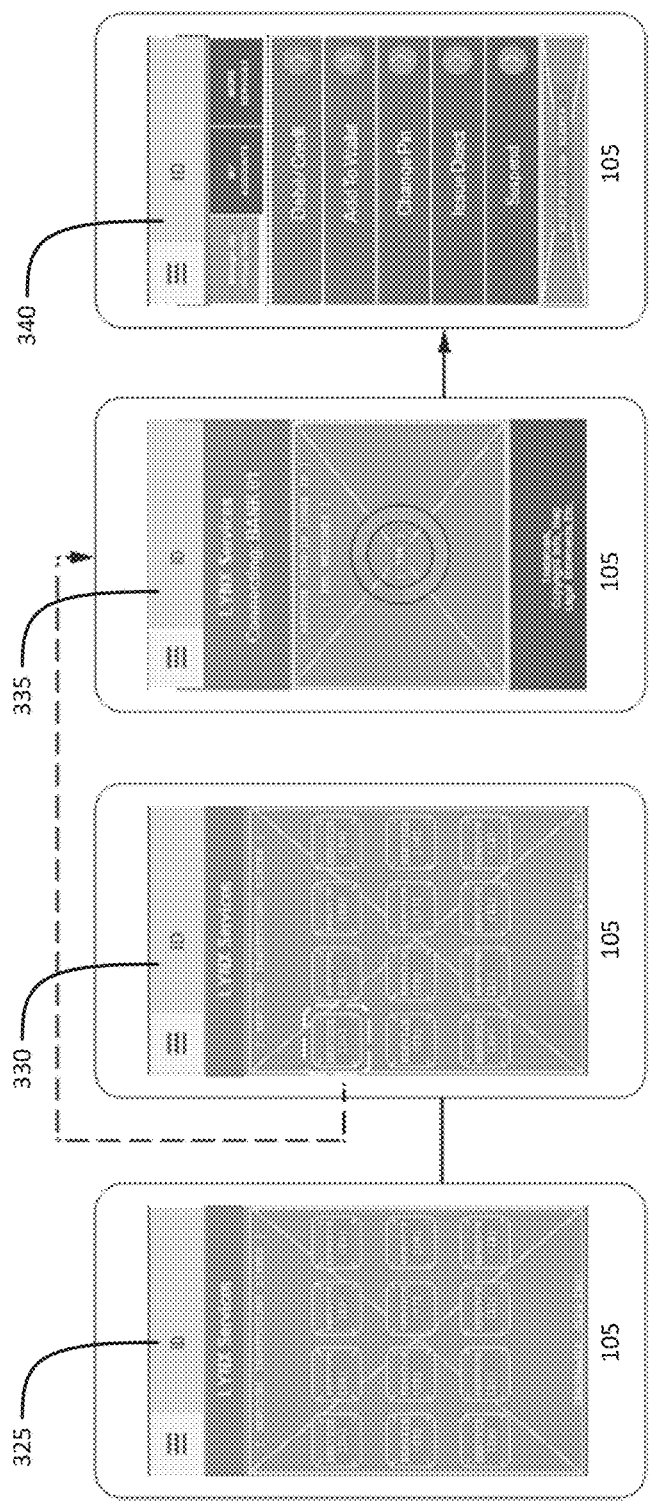
Figure 3C:
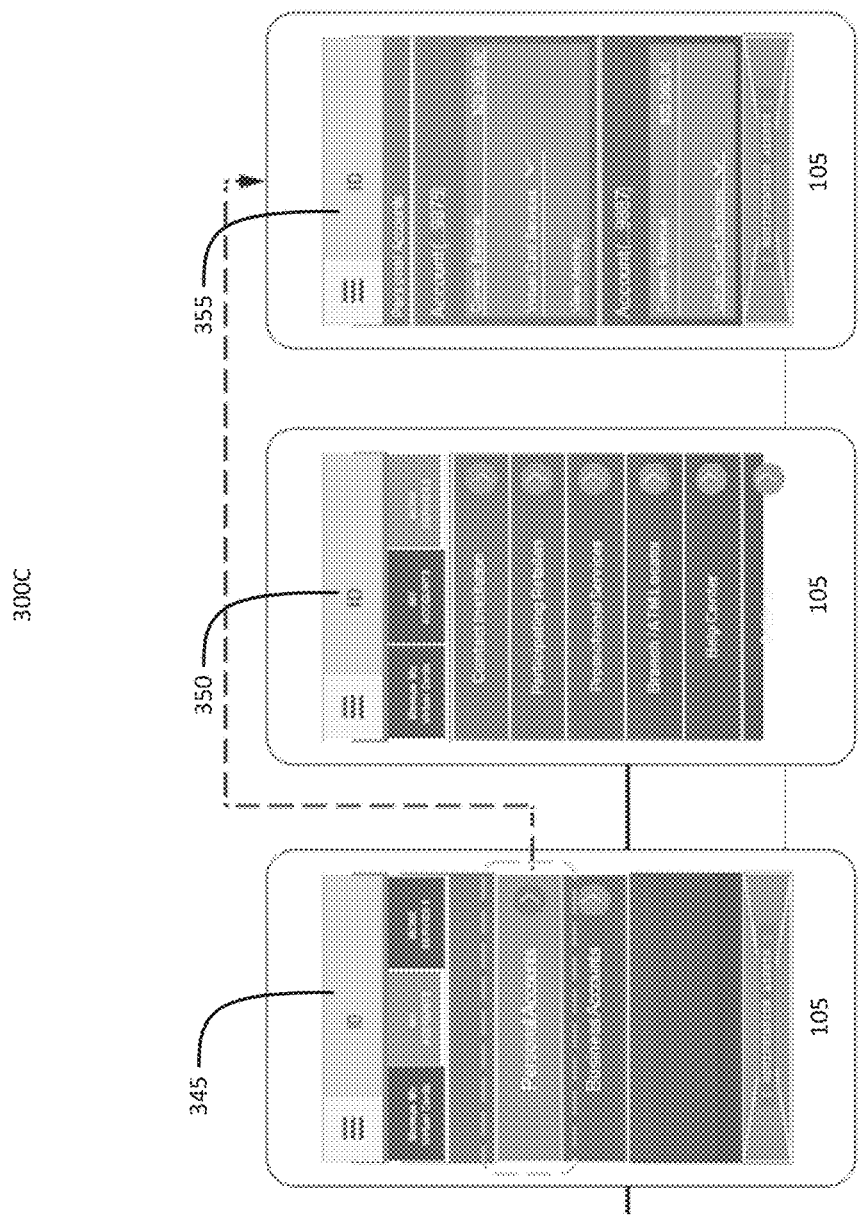

Referring now to FIGS. 3A-3C, depicted are block diagrams of graphical user interfaces for the authentication application 230 on a display element of the end user device 105. Starting with FIG. 3A, shown are graphical user interfaces 305-320 for the authentication application 230. On graphical user interface 305, the authentication application 230 may prompt the user of the end user device 105 to place a finger on a fingerprint sensor of the end user device 105. Once the fingerprint is received, the authentication application 230 may prompt the user to enter a personal identification number (PIN) user interface 310. The user may enter the PIN on the graphical user interface 315. Once the PIN is entered, the authentication application 230 may pull a list of service entities as seen on graphical user interface 320. Each on the list of service entities may correspond to a bank, a financial institution, or any other entity that may issue electronic cards for user at the end user device 105.

On FIG. 3B, on the graphical user interface 325, the authentication application 230 may populate the list of service entities that may issue electronic cards. On graphical user interface 330, the user may select from one of the list of service entities using the end user device 105. On graphical user interface 335, the authentication application 230 may load the authentication plug-in 240 and may display a loading screen for establishing secure communications with the secure gateway 205. The authentication plug-in 240 may then display the graphical user interface 340 for managing virtual electronic cards.

On FIG. 3C, the authentication plug-in 240 may display graphical user interfaces 345-355 for accessing various options related to the account with the service entity. On graphical user interface 345, the authentication plug-in 240 may display various types of accounts associated with the user of the end user device 105. On graphical user interface 350, the authentication plug-in 240 may display miscellaneous services associated with the account for the user of the end user device 105. On graphical user interface 355, after the selection of the personal accounts option on graphical user interface 345, the authentication plug-in 240 may display account information related to "personal accounts" of the user of the end user device 105.

Figure 4A:
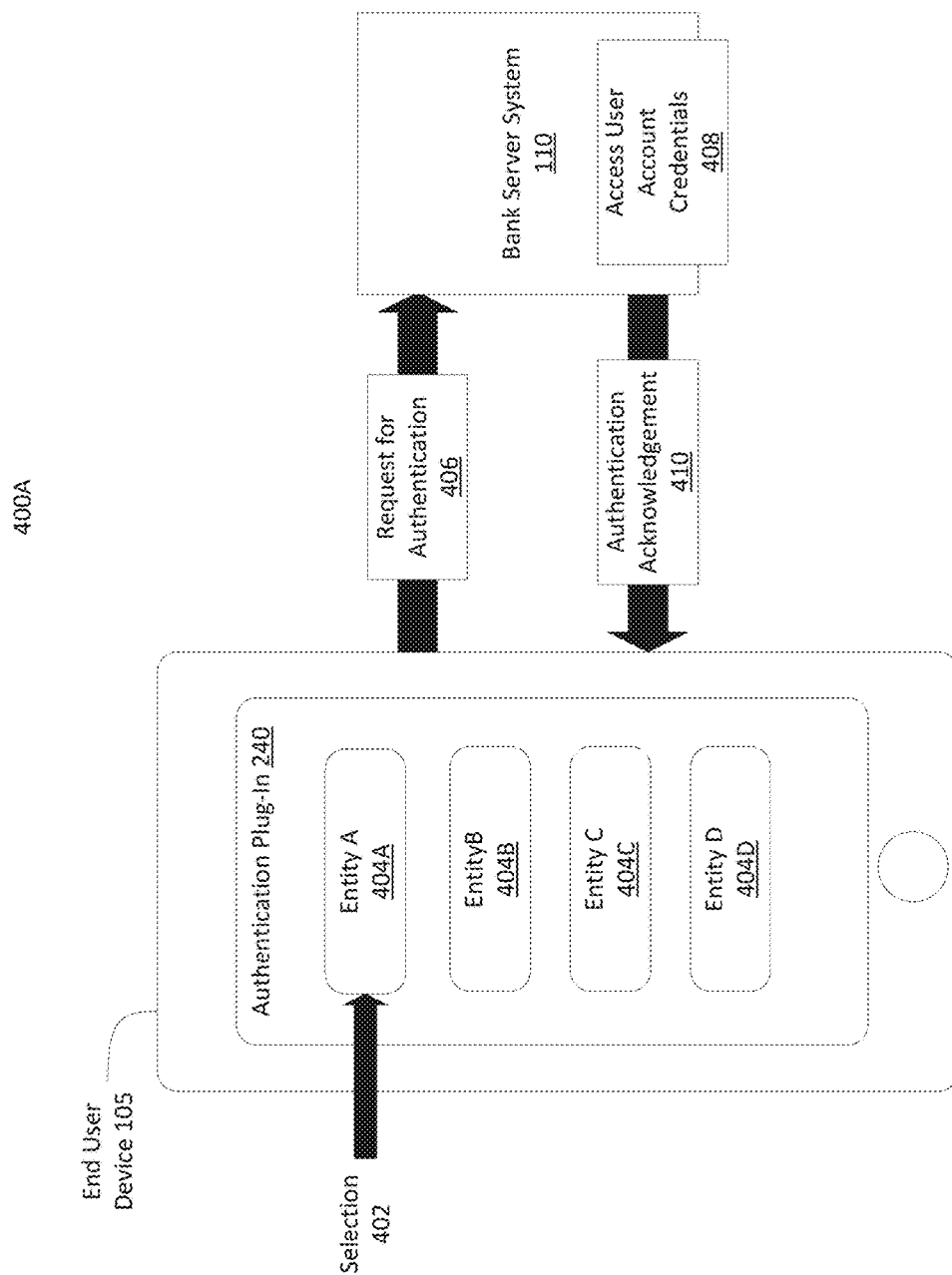
FIGS. 4A-4E are block diagrams depicting communication between components of the system for authenticating and issuing electronic cards using encryption information passed via plug-ins , according to an illustrative embodiment.

Referring now to FIGS. 4A-4E, illustrated are block diagrams depicting communication between components of the system. Starting with FIG. 4A, FIG. 4A, shows a scenario of the user selecting a card issuing entity. The authentication plug-in 240 may display a list of entities 404A-404D. From the list of entities 404A-404D, the user may make a selection 402. The authentication plug-in 240 may in turn send a request for authentication 406 to the bank server system 110. The request for authentication 406 may include authentication information. The bank server system 110 may access user account credentials 408 to verify the authentication information included in the request. The bank server system 110 in turn may issue an authentication acknowledgement 410. With the receipt of the acknowledgement, the authentication plug-in 240 may request issuance of electronic cards.

Figure 4B:
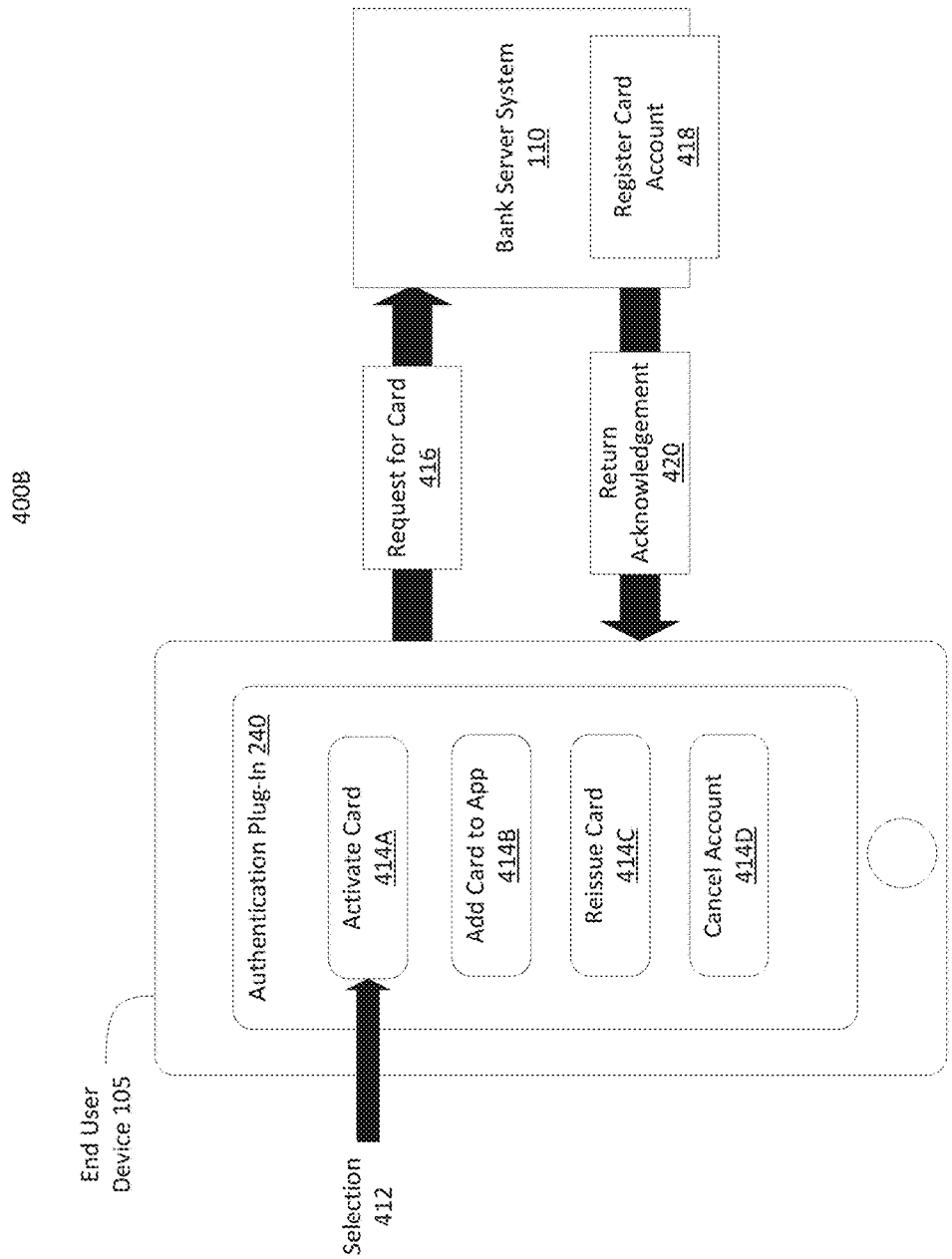

On FIG. 4B, FIG. 4B depicts a scenario of a user registering and activate a virtual card account. Upon acknowledgement, the authentication plug-in 240 may display a list of options, such as activation of card 414A, addition of card to a mobile payment application 414B, a reissuance of card 414C, and cancelation of the account 414D. As depicted, the user of the end user device 105 may make a selection 412 of the activation of card 414A option. In turn, the authentication plug-in 240 may make a request for a card 416. The request 416 may include account information for the entity selected from the previous graphical user interface. The bank server system 110 may register the card account 418 on the database. The bank server system 110 may in turn return an acknowledgement of registration 420 to the end user device 105.

Figure 4C:
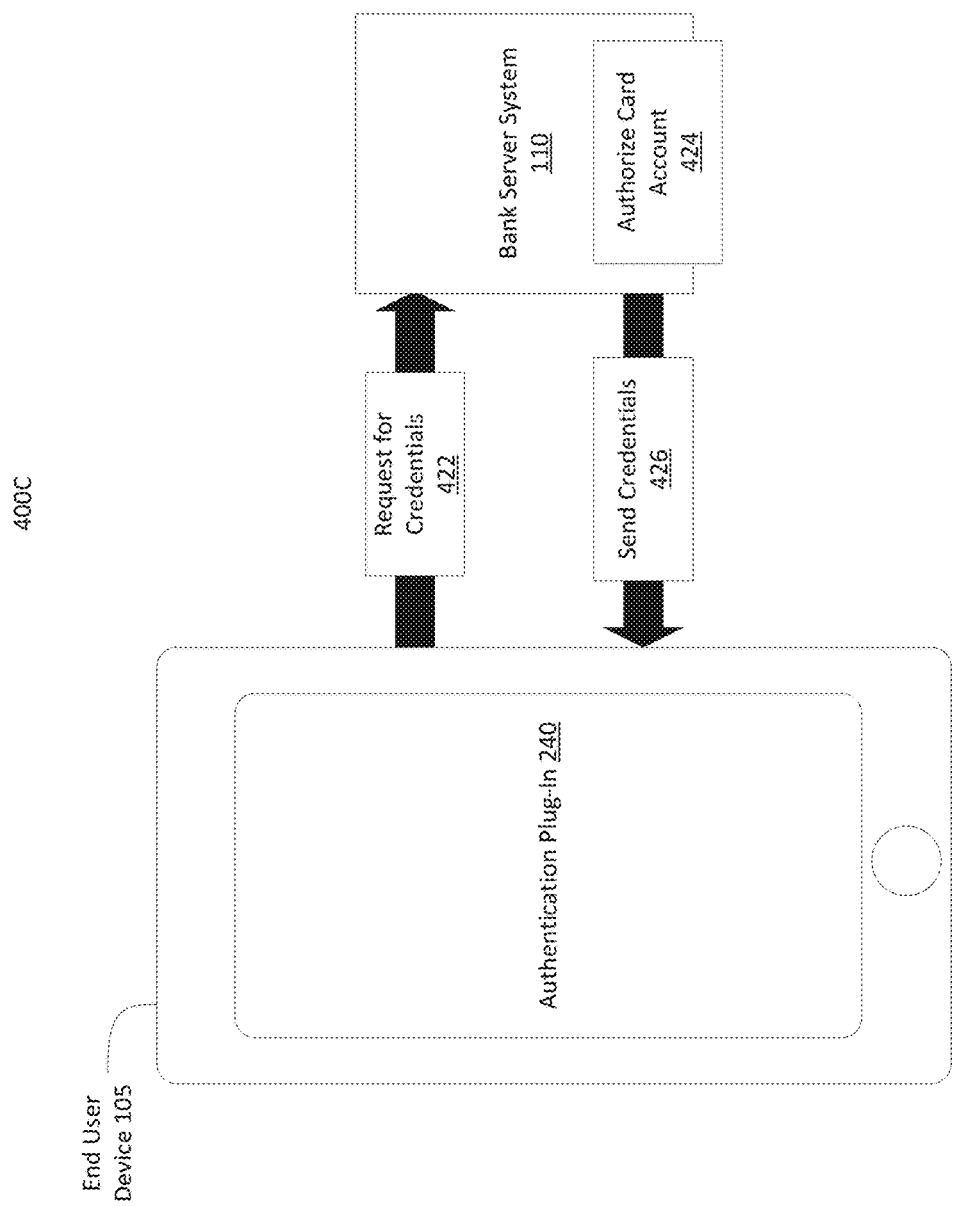

On FIG. 4C, FIG. 4C illustrates a scenario of a user requesting and receive card credentials. As illustrated, the authentication plug-in 240 may make a request for card credentials 422. The request for card credentials 422 may include encrypted account information. The authentication plug-in 240 may already have the account information for the electronic card. The bank server system 110 may in turn authorize the card account 424 by comparing the account information with previously stored information. The bank server system 110 may then issue card credentials for use at a mobile payment application 235 executing on the end user device 105. The card credentials may include electronic card information or an encrypted electronic card token corresponding to or included in the electronic card information.

Figure 4D:
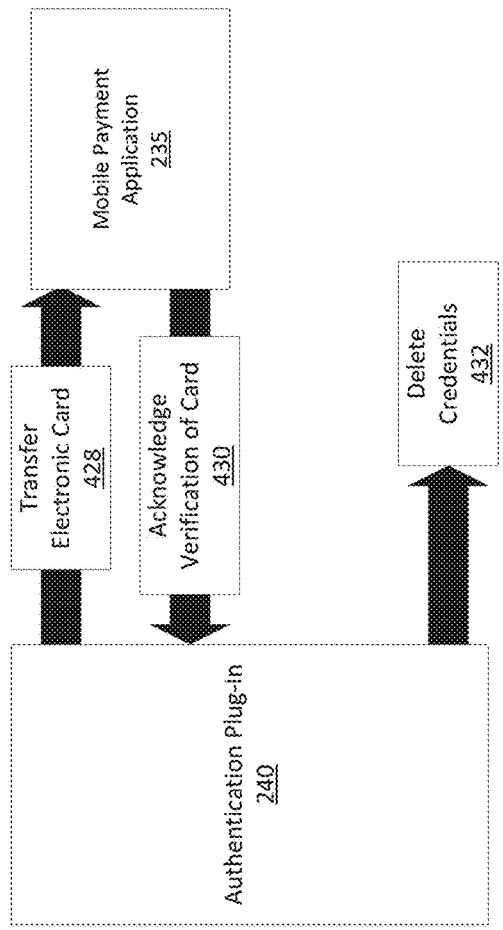

On FIG. 4D, FIG. 4D depicts a scenario of the authentication plug-in 240 transferring card credentials to the mobile payment application 235. In response to receiving the card credentials, the authentication plug-in 240 may transfer electronic card 428 to the mobile payment application 235. The electronic card may include card credentials, such as the electronic card information or the encrypted electronic card token corresponding to the electronic card information. The mobile payment application 235 in turn may store the card credentials and may return an acknowledgement of verification 430 to the authentication plug-in 240. Upon the acknowledgement, the authentication plug-in 240 may delete card credentials 432 from memory assigned to the authentication plug-in 240.

Figure 4E:
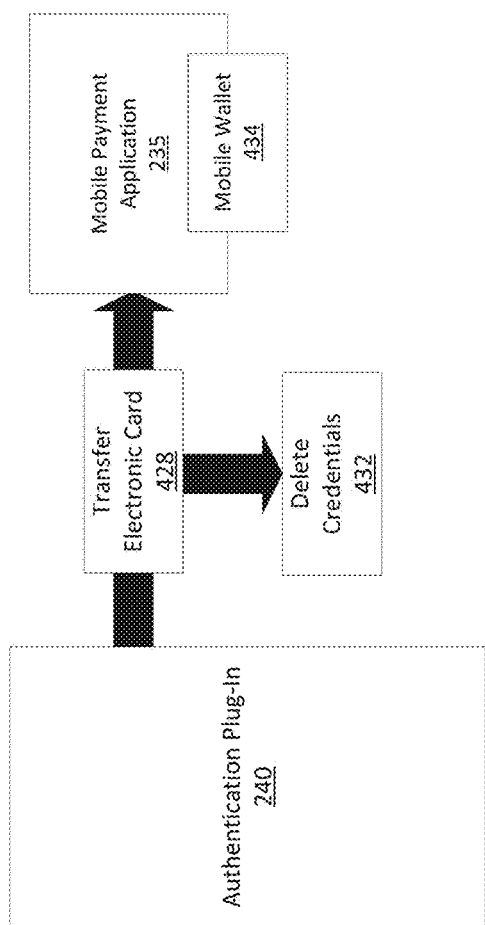

On FIG. 4E, FIG. 4E shows a scenario of the authentication plug-in 240 deleting the card credentials while transferring the electronic card. Similar to FIG. 4D, in response to receiving the card credentials, the authentication plug-in 240 may transfer the electronic card 428 to the mobile payment application 235. The mobile payment application 235 may use the information of the electronic card 428 with a mobile wallet 434. While the transfer is occurring, the authentication plug-in 240 may delete the card credentials 432 from memory assigned to the authentication plug-in 240.

Figure 5A:
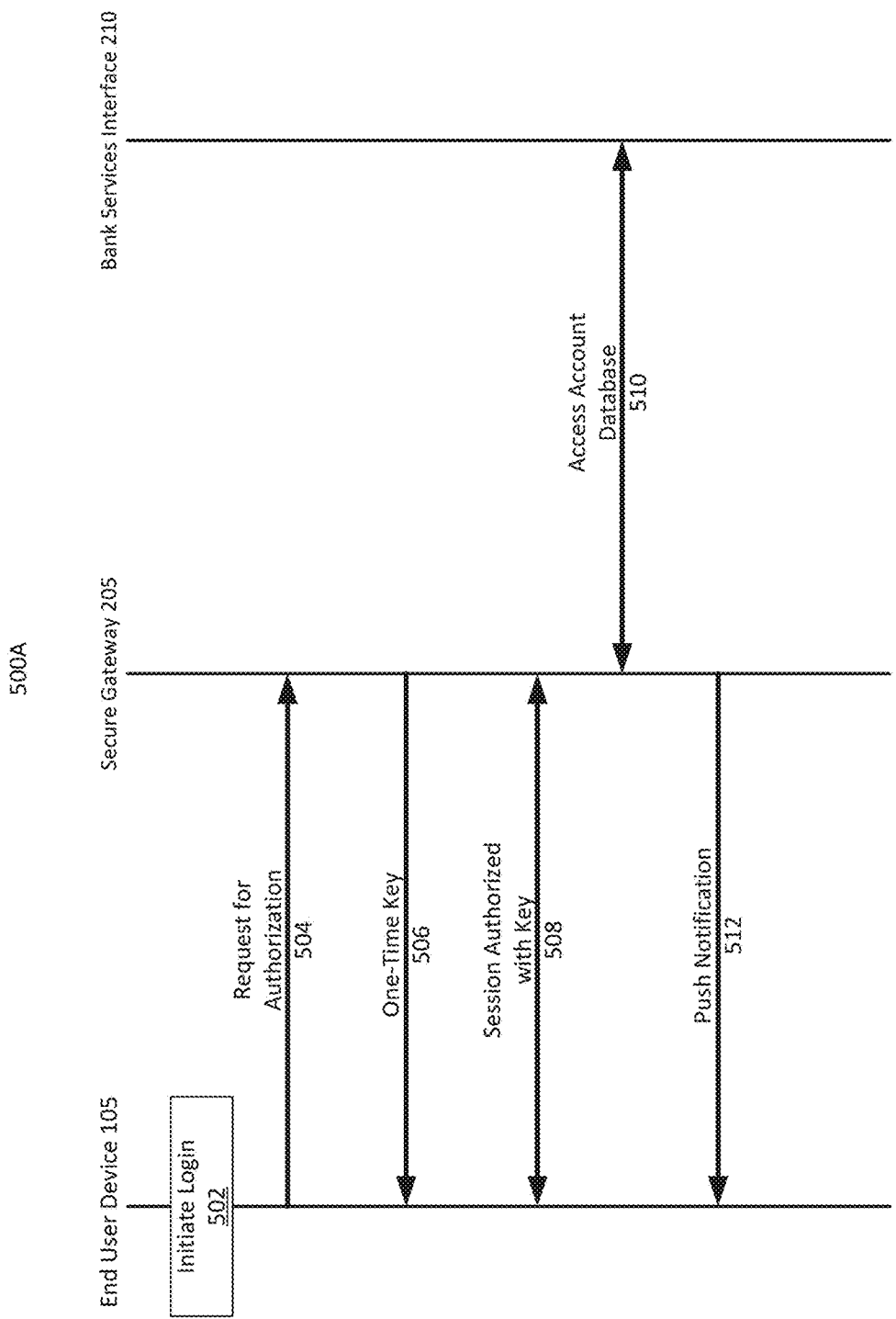
FIGS. 5A-5D are data flow diagrams depicting a system for authenticating and issuing electronic cards using encryption information passed via plug-ins, according to an illustrative embodiment

Referring now to FIGS. 5A-5D, depicted are data flow diagrams for a system for authenticating and issuing electronic cards using encryption information passed via plug-ins. Starting with FIG. 5A, FIG. 5A shows a scenario of the authentication application 230 or the authentication plug-in 240 linking accounts registered at the bank server system 110. The end user device 105 may initiate login 502. The login action 502 may include a request for one time use. The request for one-time use may include bank login information (e.g., account identifier), biometric information (e.g., fingerprints or iris scan), a device identifier, and a personal identification number, among others. The end user device 105 may then send a request for authorization 504 to the secure gateway 205 of the bank server system 110. The secure gateway 205 may in turn send a one-time key 506. The one-time key may be a public encryption key used to encrypt the communications between the end user device 105 and the bank server system 110. Using the key, the end user device 105 and the secure gateway 205 may establish a secure communications session 508. The secure gateway 205 may in turn access an account database 510. Once accessed, the secure gateway 205 may send a push notification 512 to the end user device 105.

Figure 5B:
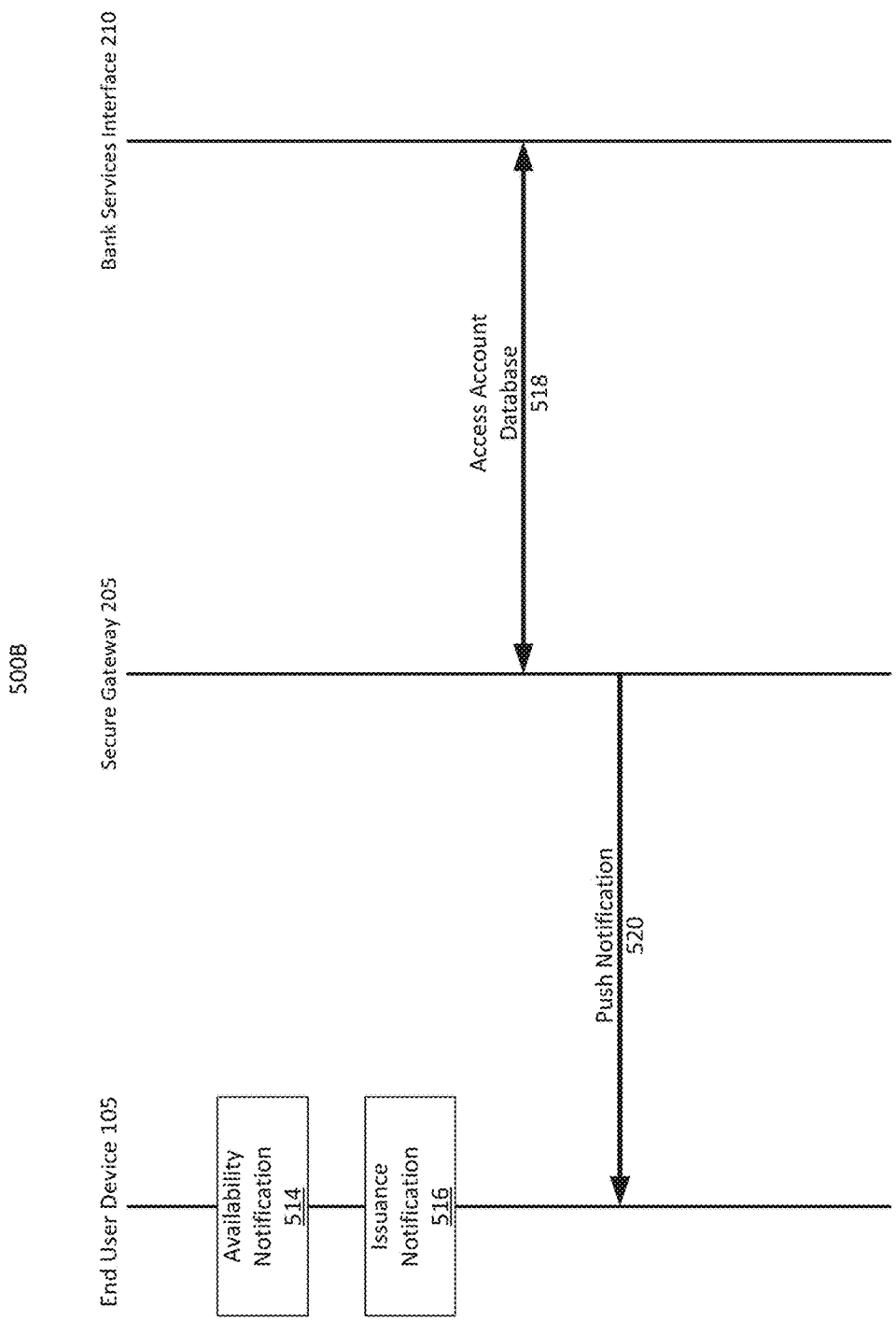

On FIG. 5B, FIG. 5B illustrates a scenario of the bank server system 110 issuing an electronic card notification. The end user device 105 may display that an electronic card is available 514. The end user device 105 sometime subsequently may display that the electronic card has issued 514. In the meanwhile, at the bank server system 110, the secure gateway 205 may access an account database 518 at the bank services interface 210. The secure gateway 205 may in turn send a push notification 520 to the end user device 105.

Figure 5C:
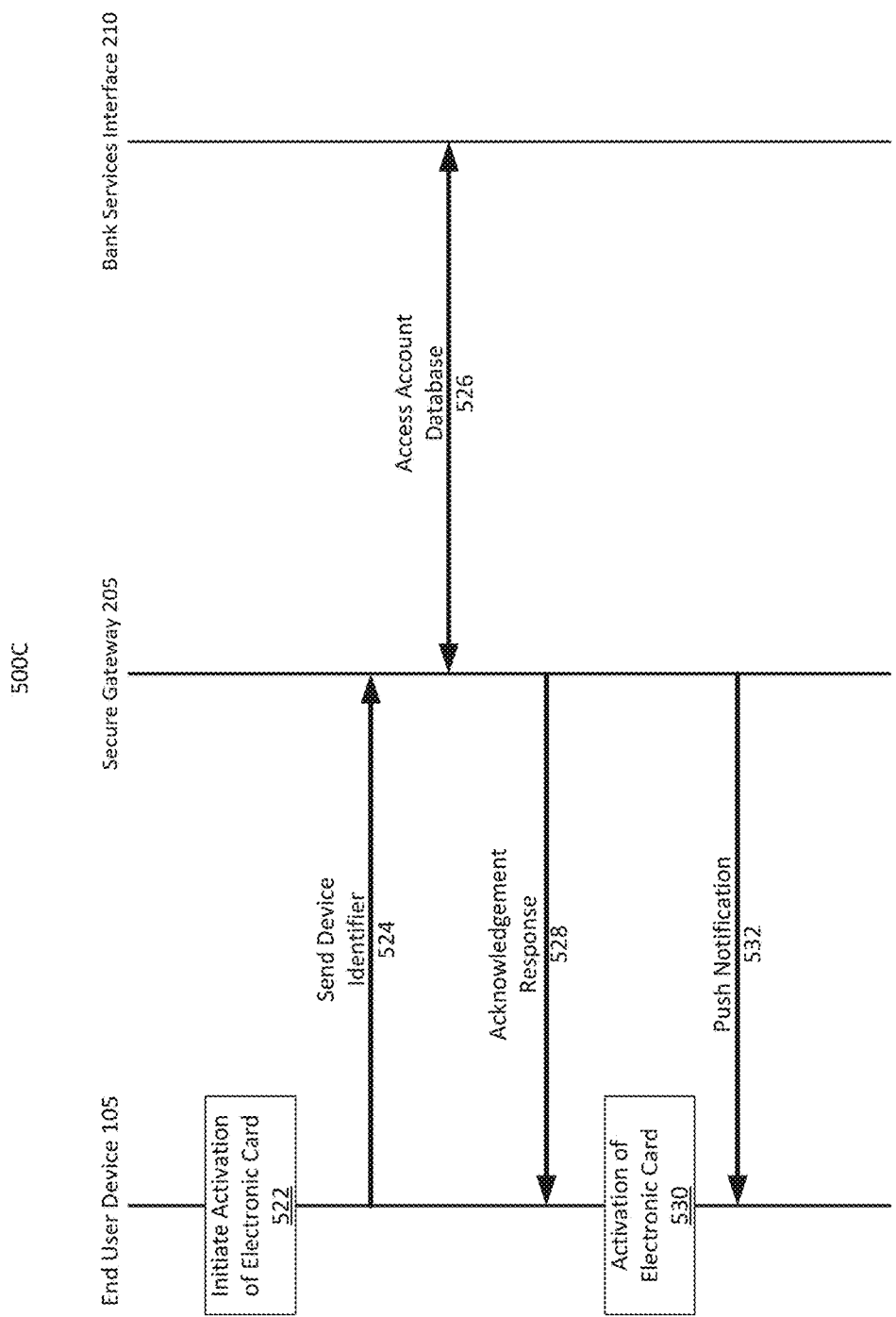

On FIG. 5C, FIG. 5C depicts a scenario of the electronic card activating the electronic card issued by the bank server system 110. The end user device 105 may initiate the activation of the electronic card 522. To complete initiation, the end user device 105 may send a device identifier 524 to the secure gateway 205. The end user device may also send biometric information and device registration information including a GPS location. The secure gateway 205 in turn may access the account database 526 to verify the device identifier. The secure gateway 205 may send an acknowledgement response 528 to the end user device 105 to complete the activation. In response to receipt of the acknowledgement response, the end user device 105 may activate the electronic card 530, and may delete the information used to activate the electronic card from memory assigned to the authentication application 230 or the authentication plug-in 240. The secure gateway 205 may send a push notification 532 to indicate completion of the activation process.

Figure 5D:
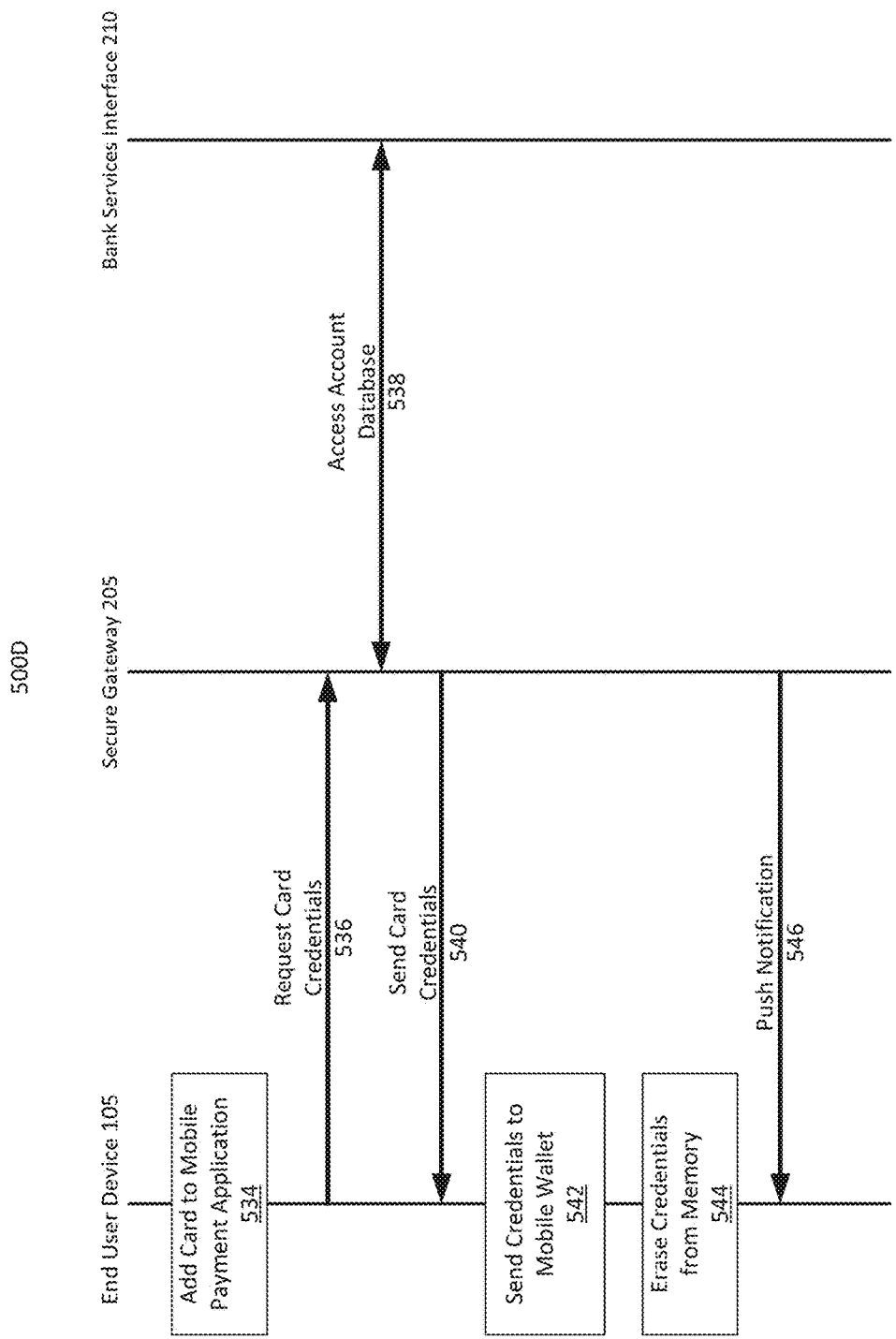

On FIG. 5D, FIG. 5D shows a scenario of adding the electronic card to a mobile wallet associated with the mobile payment application 235. The end user device 105 may add the electronic card to the mobile payment application 534 subsequent to activation. The end user device 105 may request for card credentials 536 to the secure gateway 205. The secure gateway 205 in turn may access the account database 538 to retrieve the card credentials. Once retrieved, the secure gateway 205 may send card credentials 540 to the end user device 105. The end user device 105 may in turn forward the card credentials to the mobile wallet 542. The end user device 105 may also erase credentials from memory 544. The secure gateway 205 may in turn send a push notification 546 to the end user device 105.

Figure 6:
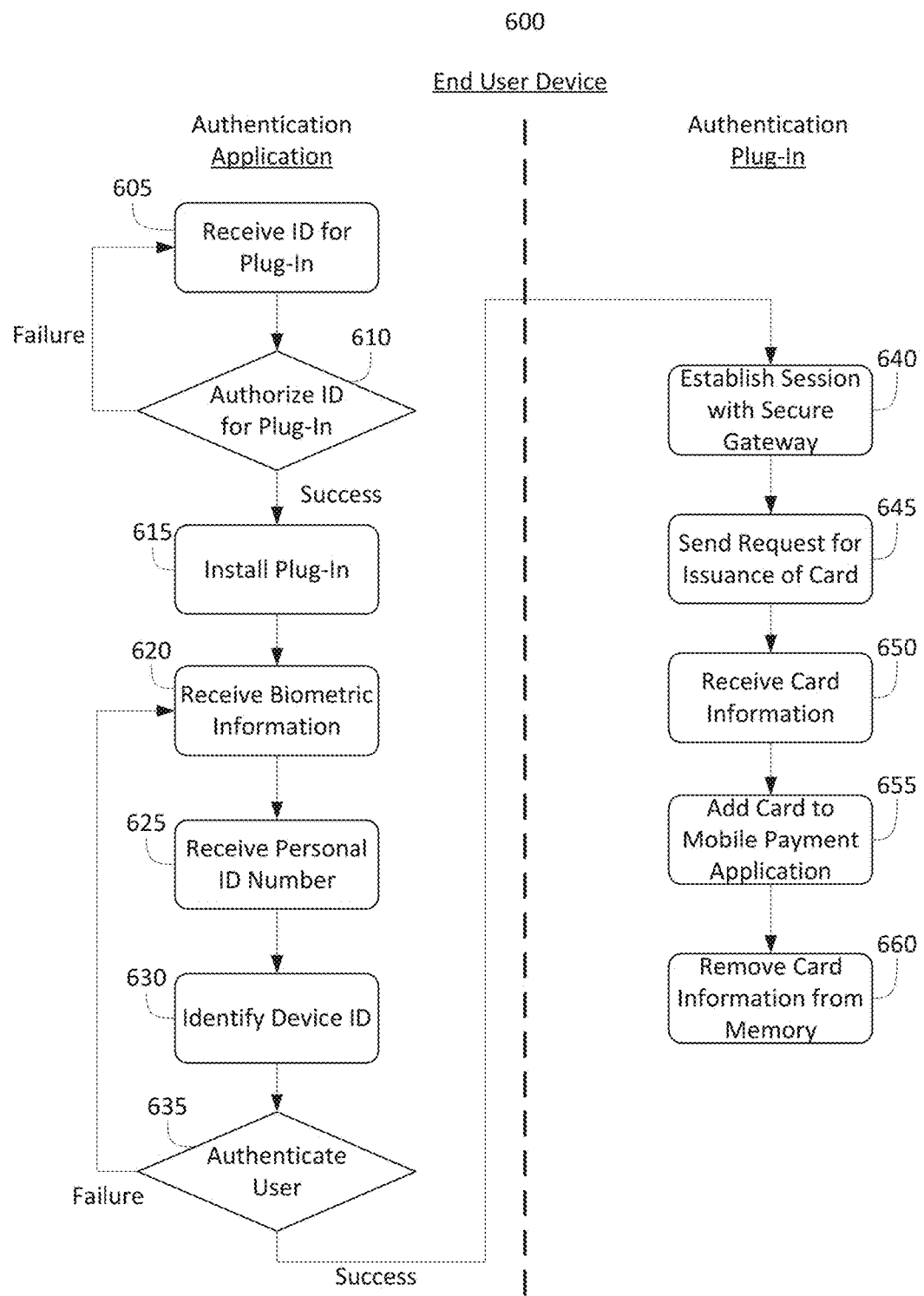
FIG. 6 is a block diagram depicting a method of authenticating and issuing electronic cards using encryption information passed via plug-ins, according to an illustrative embodiment

Referring now to FIG. 6, depicted is a block diagram of a method 600 of authenticating and issuing electronic cards using encryption information passed via plug-ins. The functionality of method 600 may be performed by system 200 detailed herein in conjunction with FIG. 2 (e.g., the authentication application 230 and/or the authentication plug-in 240 executed on the end user device 105) or system 600 described herein in conjunction with FIGS. 7A-7D.

At step 605, an authentication application may receive an identifier for a to-be-installed authentication plug-in. At step 610, the authentication application may determine whether to authorize the identifier for the to-be-installed authentication plug-in. If the authorization fails, the authentication application may repeat the functionality of step 605, and may receive another identifier. If the authorization succeeds, at step 615, the authentication application may install the authentication plug-in on the end user device.

To authenticate the use of the authentication plug-in, at step 620, the authentication application may receive biometric information (e.g., fingerprint or iris scan, etc.). At step 625, the authentication application may receive a personal identification number (PIN). At step 630, the authentication application may identify a device identifier. Using the authentication information received at steps 620-630, at step 635, the authentication application may authenticate the user of the end user device for use of the authentication plug-in. If the authentication fails, the authentication application may repeat the functionalities of steps 620-630.

In contrast, if the authentication succeeds, at step 640, the authentication plug-in may establish a secure communications session with a secure gateway. At step 645, the authentication plug-in may send a request for an issuance of an electronic card. Subsequently, at step 650, the authentication plug-in may receive electronic card information from the secure gateway. At step 655, the authentication plug-in may add or transfer the electronic card information to a mobile payment application. At step 660, the authentication plug-in may remove the electronic card information from memory assigned to the authentication plug-in or the authentication application.

B. Computing and Network Environment

Figure 7A:
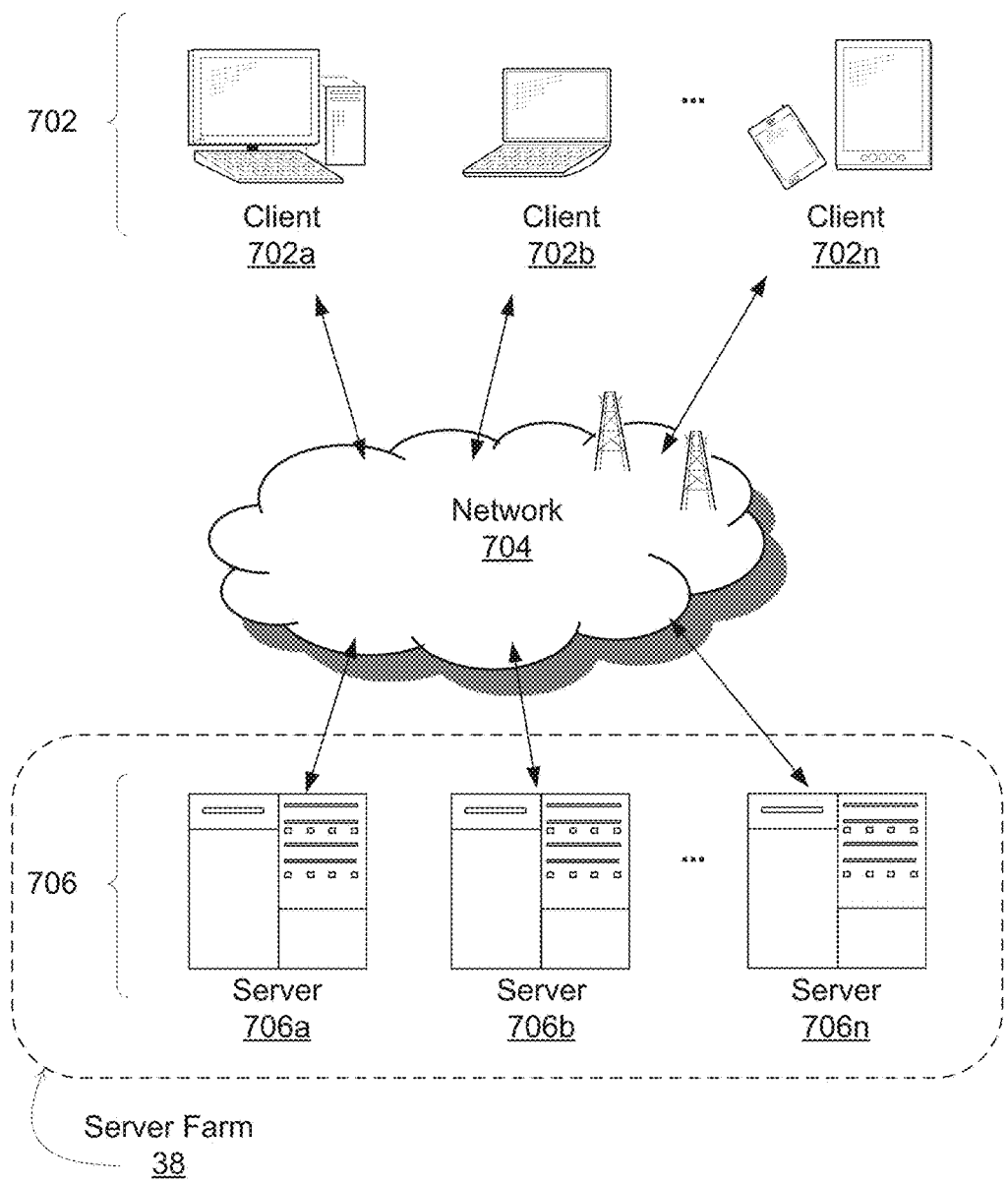
FIG. 7A is a block diagram depicting an embodiment of a network environment comprising client devices in communication with server devices.

It may be helpful to describe aspects of the operating environment as well as associated system components (e.g., hardware elements) in connection with the methods and systems described herein. Referring to FIG. 7A, an embodiment of a network environment is depicted. In brief overview, the illustrated exploring network environment includes one or more clients 702a-702n (also generally referred to as local machine(s) 702, client(s) 702, client node(s) 702, client machine(s) 702, client computer(s) 702, client device(s) 702, endpoint(s) 702, or endpoint node(s) 702) in communication with one or more servers 706a-606n (also generally referred to as server(s) 706, node 706, or remote machine(s) 706) via one or more networks 704. In some embodiments, a client 702 has the capacity to function as both a client node seeking access to resources provided by a server and as a server providing access to hosted resources for other clients 702a-702n.

Although FIG. 7A shows a network 704 between the clients 702 and the servers 706, the clients 702 and the servers 706 may be on the same network 704. In some embodiments, there are multiple networks 704 between the clients 702 and the servers 706. In one of these embodiments, a network 704' (not shown) may be a private network and a network 704 may be a public network. In another of these embodiments, a network 704 may be a private network and a network 704' a public network. In still another of these embodiments, networks 704 and 704' may both be private networks.

The network 704 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 704 may be any type and/or form of network. The geographical scope of the network 704 may vary widely and the network 704 can be a body area network (BAN), a personal area network (PAN), a local-area network (LAN), e.g. Intranet, a metropolitan area network (MAN), a wide area network (WAN), or the Internet. The topology of the network 704 may be of any form and may include, e.g., any of the following: point-to-point, bus, star, ring, mesh, or tree. The network 704 may be an overlay network, which is virtual and sits on top of one or more layers of other networks 704'. The network 704 may be of any such network topology as known to those ordinarily skilled in the art capable of supporting the operations described herein. The network 704 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 704 may be a type of a broadcast network, a telecommunications network, a data communication network, or a computer network.

In some embodiments, the system may include multiple, logically-grouped servers 706. In one of these embodiments, the logical group of servers may be referred to as a server farm 38 or a machine farm 38. In another of these embodiments, the servers 706 may be geographically dispersed. In other embodiments, a machine farm 38 may be administered as a single entity. In still other embodiments, the machine farm 38 includes a plurality of machine farms 38. The servers 706 within each machine farm 38 can be heterogeneous—one or more of the servers 706 or machines 706 can operate according to one type of operating system platform (e.g., WINDOWS NT, manufactured by Microsoft Corp. of Redmond, Wash.), while one or more of the other servers 706 can operate on according to another type of operating system platform (e.g., Unix, Linux, or Mac OS X).

In one embodiment, servers 706 in the machine farm 38 may be stored in high-density rack systems, along with associated storage systems, and located in an enterprise data center. In this embodiment, consolidating the servers 706 in this way may improve system manageability, data security, the physical security of the system, and system performance by locating servers 706 and high performance storage systems on localized high performance networks. Centralizing the servers 706 and storage systems and coupling them with advanced system management tools allows more efficient use of server resources.

The servers 706 of each machine farm 38 do not need to be physically proximate to another server 706 in the same machine farm 38. Thus, the group of servers 706 logically grouped as a machine farm 38 may be interconnected using a wide-area network (WAN) connection or a metropolitan-area network (MAN) connection. For example, a machine farm 38 may include servers 706 physically located in different continents or different regions of a continent, country, state, city, campus, or room. Data transmission speeds between servers 706 in the machine farm 38 can be increased if the servers 706 are connected using a local-area network (LAN) connection or some form of direct connection. Additionally, a heterogeneous machine farm 38 may include one or more servers 706 operating according to a type of operating system, while one or more other servers 706 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 706 may comprise components, subsystems and modules to support one or more management services for the machine farm 38. In one of these embodiments, one or more servers 706 provide functionality for management of dynamic data, including techniques for handling failover, data replication, and increasing the robustness of the machine farm 38. Each server 706 may communicate with a persistent store and, in some embodiments, with a dynamic store.

Server 706 may be a file server, application server, web server, proxy server, appliance, network appliance, gateway, gateway server, virtualization server, deployment server, SSL VPN server, or firewall. In one embodiment, the server 706 may be referred to as a remote machine or a node. In another embodiment, a plurality of nodes may be in the path between any two communicating servers.

Figure 7B:
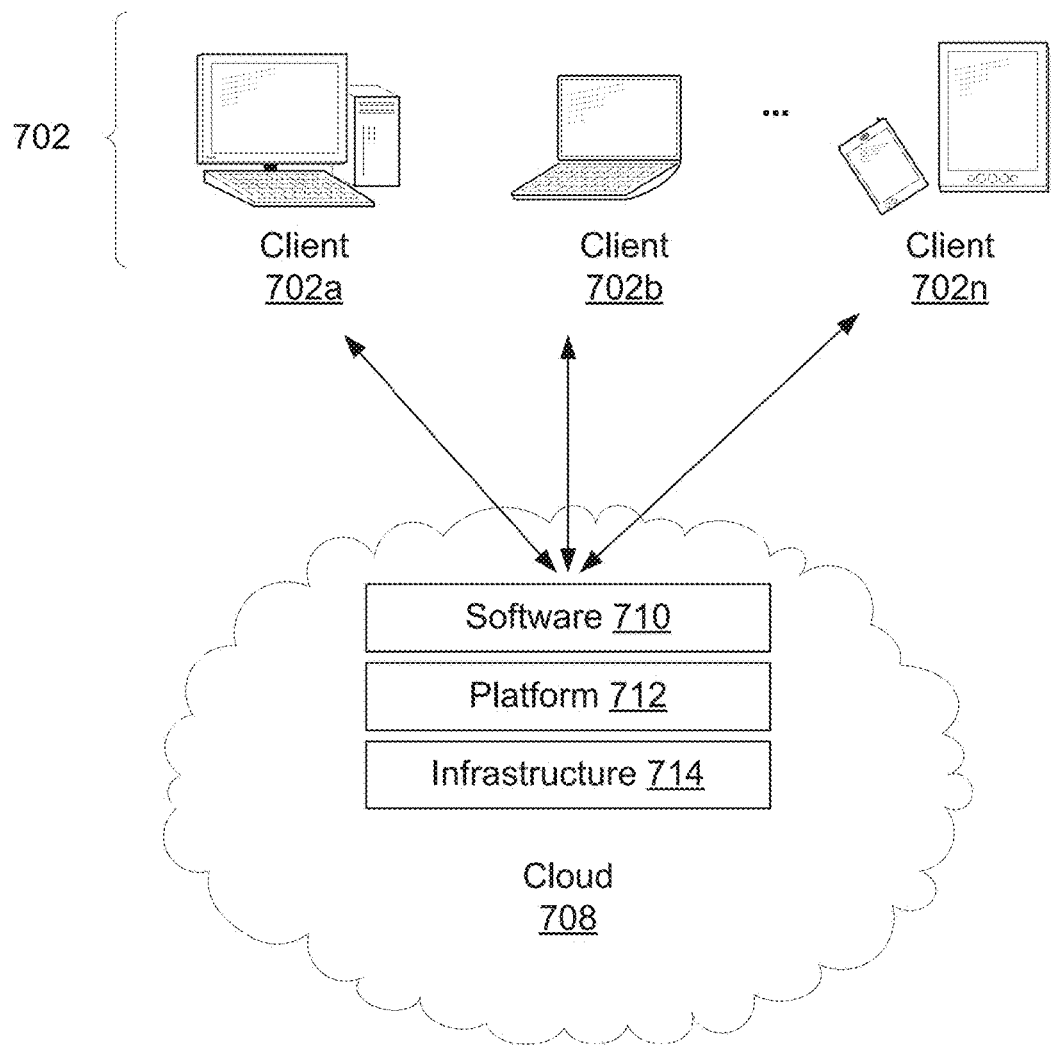
FIG. 7B is a block diagram depicting a cloud computing environment comprising client devices in communication with a cloud service provider.

Referring to FIG. 7B, a cloud computing environment is depicted. A cloud computing environment may provide client 702 with one or more resources provided by a network environment. The cloud computing environment may include one or more clients 702a-702n, in communication with the cloud 708 over one or more networks 704. Clients 702 may include, e.g., thick clients, thin clients, and zero clients. A thick client may provide at least some functionality even when disconnected from the cloud 708 or servers 706. A thin client or a zero client may depend on the connection to the cloud 708 or server 706 to provide functionality. A zero client may depend on the cloud 708 or other networks 704 or servers 706 to retrieve operating system data for the client device. The cloud 708 may include back end platforms, e.g., servers 706, storage, server farms or data centers.

The cloud 708 may be public, private, or hybrid. Public clouds may include public servers 706 that are maintained by third parties to the clients 702 or the owners of the clients. The servers 706 may be located off-site in remote geographical locations as disclosed above or otherwise. Public clouds may be connected to the servers 706 over a public network. Private clouds may include private servers 706 that are physically maintained by clients 702 or owners of clients. Private clouds may be connected to the servers 706 over a private network 704. Hybrid clouds 708 may include both the private and public networks 704 and servers 706.

The cloud 708 may also include a cloud based delivery, e.g. Software as a Service (SaaS) 710, Platform as a Service (PaaS) 712, and Infrastructure as a Service (IaaS) 714. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 702 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 702 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 702 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 702 may also access SaaS resources through smartphone or tablet applications, including, e.g., Salesforce Sales Cloud, or Google Drive app. Clients 702 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 7C:
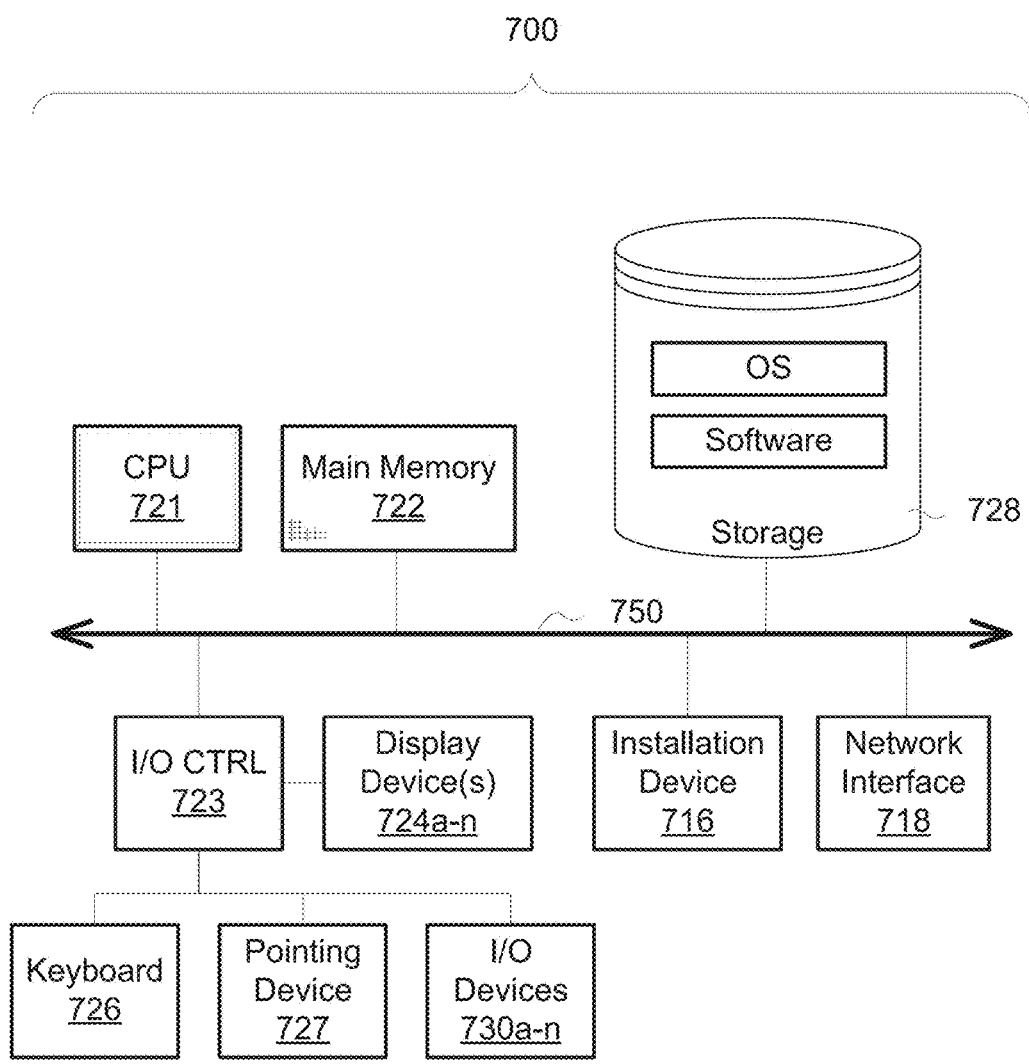
FIGS. 7C and 7D are block diagrams depicting embodiments of computing devices useful in connection with the methods and systems described herein.
Figure 7D:
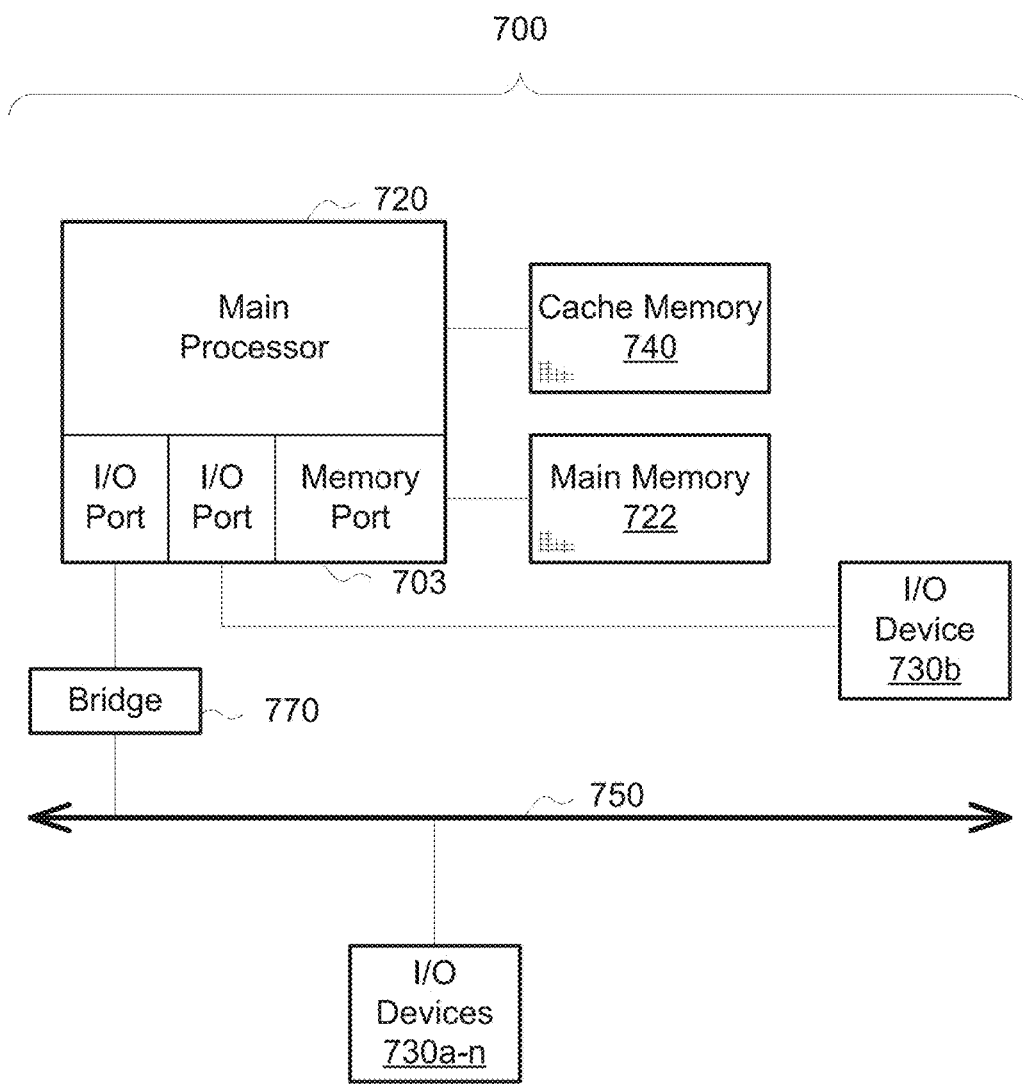

The client 702 and server 706 may be deployed as and/or executed on any type and form of computing device, e.g. a computer, network device or appliance capable of communicating on any type and form of network and performing the operations described herein. FIGS. 1C and 1D depict block diagrams of a computing device 700 useful for practicing an embodiment of the client 702 or a server 706. As shown in FIGS. 7C and 7D, each computing device 700 includes a central processing unit 721, and a main memory unit 722. As shown in FIG. 7C, a computing device 700 may include a storage device 728, an installation device 716, a network interface 718, an I/O controller 723, display devices 724a-724n, a keyboard 726 and a pointing device 727, e.g.

a mouse. The storage device 728 may include, without limitation, an operating system, and/or software. As shown in FIG. 7D, each computing device 700 may also include additional optional elements, e.g. a memory port 703, a bridge 770, one or more input/output devices 730a-730n (generally referred to using reference numeral 730), and a cache memory 760 in communication with the central processing unit 721.

The central processing unit 721 is any logic circuitry that responds to and processes instructions fetched from the main memory unit 722. In many embodiments, the central processing unit 721 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 700 may be based on any of these processors, or any other processor capable of operating as described herein. The central processing unit 721 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 722 may include one or more memory chips capable of storing data and allowing any storage location to be directly accessed by the microprocessor 721. Main memory unit 722 may be volatile and faster than storage 728 memory. Main memory units 722 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 722 or the storage 728 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 722 may be based on any of the above described memory chips, or any other available memory chips capable of operating as described herein. In the embodiment shown in FIG. 7C, the processor 721 communicates with main memory 722 via a system bus 750 (described in more detail below). FIG. 7D depicts an embodiment of a computing device 700 in which the processor communicates directly with main memory 722 via a memory port 703. For example, in FIG. 7D the main memory 722 may be DRDRAM.

FIG. 7D depicts an embodiment in which the main processor 721 communicates directly with cache memory 760 via a secondary bus, sometimes referred to as a backside bus. In other embodiments, the main processor 721 communicates with cache memory 760 using the system bus 750. Cache memory 760 typically has a faster response time than main memory 722 and is typically provided by SRAM, BSRAM, or EDRAM. In the embodiment shown in FIG. 7D, the processor 721 communicates with various I/O devices 730 via a local system bus 750. Various buses may be used to connect the central processing unit 721 to any of the I/O devices 730, including a PCI bus, a PCI-X bus, or a PCI-Express bus, or a NuBus. For embodiments in which the I/O device is a video display 724, the processor 721 may use an Advanced Graphics Port (AGP) to communicate with the display 724 or the I/O controller 723 for the display 724. FIG. 7D depicts an embodiment of a computer 700 in which the main processor 721 communicates directly with I/O device 730b or other processors 721' via HYPERTRANSPORT, RAPIDIO, or INFINIBAND communications technology. FIG. 7D also depicts an embodiment in which local busses and direct communication are mixed: the processor 721 communicates with I/O device 730a using a local interconnect bus while communicating with I/O device 730b directly.

A wide variety of I/O devices 730a-730n may be present in the computing device 700. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 730a-730n may include a combination of multiple input or output devices, including, e.g., Microsoft KINECT, Nintendo Wiimote for the WII, Nintendo WII U GAMEPAD, or Apple IPHONE. Some devices 730a-730n allow gesture recognition inputs through combining some of the inputs and outputs. Some devices 730a-730n provides for facial recognition which may be utilized as an input for different purposes including authentication and other commands. Some devices 730a-730n provides for voice recognition and inputs, including, e.g., Microsoft KINECT, SIRI for IPHONE by Apple, Google Now or Google Voice Search.

Additional devices 730a-730n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 730a-730n, display devices 724a-724n or group of devices may be augment reality devices. The I/O devices may be controlled by an I/O controller 723 as shown in FIG. 7C. The I/O controller may control one or more I/O devices, such as, e.g., a keyboard 726 and a pointing device 727, e.g., a mouse or optical pen. Furthermore, an I/O device may also provide storage and/or an installation medium 716 for the computing device 700. In still other embodiments, the computing device 700 may provide USB connections (not shown) to receive handheld USB storage devices. In further embodiments, an I/O device 730 may be a bridge between the system bus 750 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 724a-724n may be connected to I/O controller 723. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 724a-724n may also be a head-mounted display (HMD). In some embodiments, display devices 724a-724n or the corresponding I/O controllers 723 may be controlled through or have hardware support for OPENGL or DIRECTX API or other graphics libraries.

In some embodiments, the computing device 700 may include or connect to multiple display devices 724a-724n, which each may be of the same or different type and/or form. As such, any of the I/O devices 730a-730n and/or the I/O controller 723 may include any type and/or form of suitable hardware, software, or combination of hardware and software to support, enable or provide for the connection and use of multiple display devices 724a-724n by the computing device 700. For example, the computing device 700 may include any type and/or form of video adapter, video card, driver, and/or library to interface, communicate, connect or otherwise use the display devices 724a-724n. In one embodiment, a video adapter may include multiple connectors to interface to multiple display devices 724a-724n. In other embodiments, the computing device 700 may include multiple video adapters, with each video adapter connected to one or more of the display devices 724a-724n. In some embodiments, any portion of the operating system of the computing device 700 may be configured for using multiple displays 724a-724n. In other embodiments, one or more of the display devices 724a-724n may be provided by one or more other computing devices 700a or 700b connected to the computing device 700, via the network 704. In some embodiments software may be designed and constructed to use another computer's display device as a second display device 724a for the computing device 700. For example, in one embodiment, an Apple iPad may connect to a computing device 700 and use the display of the device 700 as an additional display screen that may be used as an extended desktop. One ordinarily skilled in the art will recognize and appreciate the various ways and embodiments that a computing device 700 may be configured to have multiple display devices 724a-724n.

Referring again to FIG. 7C, the computing device 700 may comprise a storage device 728 (e.g. one or more hard disk drives or redundant arrays of independent disks) for storing an operating system or other related software, and for storing application software programs such as any program related to the software. Examples of storage device 728 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 728 may be non-volatile, mutable, or read-only. Some storage device 728 may be internal and connect to the computing device 700 via a bus 750. Some storage device 728 may be external and connect to the computing device 700 via an I/O device 730 that provides an external bus. Some storage device 728 may connect to the computing device 700 via the network interface 718 over a network 704, including, e.g., the Remote Disk for MACBOOK AIR by Apple. Some client devices 700 may not require a non-volatile storage device 728 and may be thin clients or zero clients 702. Some storage device 728 may also be used as an installation device 716, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 700 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 702. An application distribution platform may include a repository of applications on a server 706 or a cloud 708, which the clients 702a-702n may access over a network 704. An application distribution platform may include application developed and provided by various developers. A user of a client device 702 may select, purchase and/or download an application via the application distribution platform.

Furthermore, the computing device 700 may include a network interface 718 to interface to the network 704 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 700 communicates with other computing devices 700' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 718 may comprise a built-in network adapter, network interface card, PCMCIA network card, EXPRESSCARD network card, card bus network adapter, wireless network adapter, USB network adapter, modem or any other device suitable for interfacing the computing device 700 to any type of network capable of communication and performing the operations described herein.

A computing device 700 of the sort depicted in FIGS. 7B and 6C may operate under the control of an operating system, which controls scheduling of tasks and access to system resources. The computing device 700 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 700 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 700 has sufficient processor power and memory capacity to perform the operations described herein. In some embodiments, the computing device 700 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 700 is a gaming system. For example, the computer system 700 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 700 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 700 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 700 is a tablet e.g. the IPAD line of devices by Apple; GALAXY TAB family of devices by Samsung; or KINDLE FIRE, by Amazon.com, Inc. of Seattle, Wash. In other embodiments, the computing device 700 is an eBook reader, e.g. the KINDLE family of devices by Amazon.com, or NOOK family of devices by Barnes & Noble, Inc. of New York City, N.Y.

In some embodiments, the communications device 702 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 702 is a laptop or desktop computer equipped with a web browser and a microphone and speaker system, e.g. a telephony headset. In these embodiments, the communications devices 702 are web-enabled and can receive and initiate phone calls. In some embodiments, a laptop or desktop computer is also equipped with a webcam or other video capture device that enables video chat and video call. In some embodiments, the communication device 702 is a wearable mobile computing device including but not limited to Google Glass and Samsung Gear.

In some embodiments, the status of one or more machines 702, 706 in the network 704 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the related systems and methods disclosed herein.

In certain embodiments, the controller includes one or more modules structured to functionally execute the operations of the controller. In certain embodiments, the controller includes sensor modules configured to measure time lapse, energy consumption, product consumption, rotation position, a change in rotation, linear position, a change in a linear position, product location, product ingredients, or other system operating parameters or conditions impacting the use, dispensing, or operation of the system.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Non-limiting examples of various embodiments are disclosed herein. Features from one embodiments disclosed herein may be combined with features of another embodiment disclosed herein as someone of ordinary skill in the art would understand.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A method comprising:
   (a) receiving, by an authentication application on a device of a user, a unique identifier of a plugin to be installed for use within the authentication application, wherein the authentication application communicates with a secure gateway via a secure communication channel using encryption based on at least the unique identifier of the plugin;
   (b) authorizing, by the authentication application, for installation of the plugin within the authentication application, the plugin based on at least the unique identifier;
   (c) receiving, by the authentication application, for the authorized plugin installed in the authentication application responsive to authorizing the plugin, biometric information of the user and a unique device identifier corresponding to the device;
   (d) authenticating, by the authentication application, the user for use of the authorized plugin based on at least the biometric information of the user and the unique device identifier;
   (e) receiving, by the authorized plugin from the user authenticated to use the authorized plugin via the authentication application, a request to issue an electronic card via the secure communication channel established between the authentication application and the secure gateway;
   (f) receiving, by the plugin responsive to sending the request via the secure communication channel with the security gateway, the electronic card information for the electronic card issued to the user of the device via a receiver of the request via the secure gateway; and
   (g) automatically adding, by the plugin responsive to receiving the electronic card information, the electronic card into a mobile payment application of the device using the electronic card information.

2. The method of claim 1, further comprising removing, by the plugin, the electronic card information from memory of the device upon adding the electronic card into the mobile payment application.

3. The method of claim 1, wherein the unique identifier of the plugin is issued to the receiver by a party controlling use of plugins with the authentication application.

4. The method of claim 1, wherein (b) further comprises validating, by the authentication application, the unique identifier of the plugin was issued to the plugin.

5. The method of claim 1, wherein (c) further comprises receiving, by the plugin, biometric information of the user comprising one of fingerprint, a voice input, one or more facial characteristics, one or more iris characteristics or biometric input supported by the device.

6. The method of claim 1, wherein (c) further comprises obtaining, by the plugin, from memory or storage of the device the unique device identifier comprising one of a universal unique device identifier, an advertising identifier, a telephone number or media access control identifier.

7. The method of claim 1, wherein (d) further comprises authenticating, by the plugin, the user for one of a one time use or a limited duration use, for a transaction via the secure gateway.

8. The method of claim 1, wherein (c) further comprises receiving, by the plugin, a personal identification identifier entered by the user via the device.

9. The method of claim 8, wherein (d) further comprises authenticating the user for use of the authorized plugin based on at least the biometric information of the user, the unique device identifier and the personal identification identifier.

10. The method of claim 1, wherein (f) further comprises establishing between the authorized plugin and the secure gateway the secure communication channel using at least the unique identifier of the plugin.

11. The method of claim 1, wherein (f) further comprising transmitting, by the plugin via the secure gateway to the receiver, identification of the user and the unique device identifier.

12. The method of claim 1, wherein (g) further comprises adding, by the plugin, the electronic card to a mobile electronic wallet provided by the mobile payment application using an application programming interface of the mobile payment application.

13. The method of claim 1, wherein the electronic card information comprises an encrypted electronic card token.

14. A system comprising:
   an authentication application on a device of a user, the authentication application configured to:
      receive a unique identifier of a plugin to be installed for use within the authentication application, wherein the authentication application communicates with a secure gateway via a secure communication channel using encryption based on at least the unique identifier of the plugin;
      authorize, for installation of the plugin within the authentication application, the plugin based on at least the unique identifier and the authorized plugin is installed in the authentication application;
      receive, for the suthorized plugin installed in the authentication application responsive to the authroization of the plugin, biometric information of the user and a unique device identifier,
      authenticate the user for use of the authorized plugin based on at least the biometric information of the user and the unique device identifier;
   wherein the authroized plugin is configured to:
      receive, from the user authenticated to use the authorized plugin via the authentication application, a request to issue an electronic card via the secure communication channel established between the authentication application and the secure gateway;
      receive, responsive to sending the request via the secure communication channel with the security gateway, electronic card information of the electronic card issued to the user of the device via a receiver of the request via the secure gateway; and
      automatically add, responsive to receiving the electronic card information, the electronic card into a mobile payment application on the device using the electronic card information decrypted in memory.

15. The system of claim 14, wherein the plugin is further configured to remove the electronic card information from memory of the device upon adding the electronic card into the mobile payment application.

16. The system of claim 14, wherein the unique identifier of the plugin is issued to the receiver by a party controlling use of plugins with the authentication application.

17. The system of claim 14, wherein the authentication application is further configured to validate that the unique identifier of the plugin was issued to the plugin.

18. The system of claim 14, wherein the biometric information of the user comprises one of fingerprint, a voice input, one or more facial characteristics or one or more iris characteristics or biometric input supported by the device.

19. The system of claim 14, wherein the plugin is further configured to obtain from memory or storage of the device the unique device identifier comprising one of a universal unique device identifier, an advertising identifier, a telephone number or media access control identifier.

20. The system of claim 14, wherein the plugin is further configured to authenticate the user for one of a one time use or a use for a limited duration, for a transaction via the secure gateway.

21. The system of claim 14, wherein the plugin is further configured to receive a personal identification identifier entered by the user via the device.

22. The system of claim 21, wherein the plugin is further configured to authenticate the user for use of the authorized plugin based on at least the biometric information of the user, the unique device identifier and the personal identification identifier.

23. The system of claim 14, wherein the authentication application and the secure gateway establish the secure communication channel using at least the unique identifier of the plugin.

24. The system of claim 14, wherein the plugin is further configured to transmit via the secure gateway to the receiver, identification of the user and unique device identifier.

25. The system of claim 14, wherein the plugin is further configured to add the electronic card to a mobile electronic wallet provided by the mobile payment application using an application programming interface of the mobile payment application.

26. The system of claim 14, wherein the electronic card information comprises an encrypted electronic card token.

* * * * *